(12) United States Patent
Mauricio et al.

(10) Patent No.: US 8,915,008 B2
(45) Date of Patent: Dec. 23, 2014

(54) FUSED OPTIC

(75) Inventors: Jeremiah Mauricio, Tecumseh, MI (US); Anthony M. Horvath, Temperance, MI (US); Edward J. Haney, Gaines, MI (US); Mark William Lister, Berkley, MI (US)

(73) Assignee: Trijicon, Inc., Wixom, MI (US)

( * ) Notice: Subject to any disclaimer, the term of this patent is extended or adjusted under 35 U.S.C. 154(b) by 629 days.

(21) Appl. No.: 13/196,180

(22) Filed: Aug. 2, 2011

(65) Prior Publication Data

US 2012/0030985 A1 Feb. 9, 2012

Related U.S. Application Data

(60) Provisional application No. 61/370,591, filed on Aug. 4, 2010.

(51) Int. Cl.
| | |
|---|---|
| *F41G 1/36* | (2006.01) |
| *F41G 1/38* | (2006.01) |
| *F41G 3/16* | (2006.01) |
| *F41G 3/32* | (2006.01) |
| *F41G 11/00* | (2006.01) |

(52) U.S. Cl.
CPC *F41G 1/38* (2013.01); *F41G 3/165* (2013.01); *F41G 3/326* (2013.01); *F41G 11/001* (2013.01); *F41G 11/007* (2013.01)
USPC .......................................................... 42/111

(58) Field of Classification Search
CPC ........................................................ F41G 1/36
USPC ............................................ 42/111, 119, 84
See application file for complete search history.

(56) References Cited

U.S. PATENT DOCUMENTS

| | | | |
|---|---|---|---|
| 5,035,472 | A | 7/1991 | Hansen |
| 5,339,720 | A | 8/1994 | Pellarin et al. |
| 5,898,519 | A | 4/1999 | Palmer |
| 5,937,562 | A | 8/1999 | Brough |
| 6,131,294 | A | 10/2000 | Jibiki |
| 6,449,419 | B1 | 9/2002 | Brough et al. |
| 6,530,782 | B2 | 3/2003 | Fouse et al. |
| 6,538,811 | B2 | 3/2003 | Meier |
| 6,560,029 | B1 | 5/2003 | Dobbie et al. |
| 6,608,298 | B2 | 8/2003 | Gaber |
| 6,637,144 | B2 | 10/2003 | Nelson et al. |

(Continued)

OTHER PUBLICATIONS

Notification of Transmittal of the International Search Report and the Written Opinion of the International Searching Authority, or the Declaration, and the International Search Report for International Application No. PCT/US2011/046262, dated Mar. 29, 2012.

(Continued)

*Primary Examiner* — Reginald Tillman, Jr.
(74) *Attorney, Agent, or Firm* — Harness, Dickey & Pierce, P.L.C.

(57) ABSTRACT

An optical sight is provided and may include an optics train having at least one prism with a first surface, a display associated with the first surface to selectively supply the first surface with an image, and a processor in communication with the display to provide the display with the image. An infrared camera may be in communication with the processor and may provide the processor with thermal-energy data for use by the processor in generating the image.

12 Claims, 15 Drawing Sheets

(56) References Cited

U.S. PATENT DOCUMENTS

| | | |
|---|---|---|
| 6,649,092 B2 | 11/2003 | Vicker et al. |
| 6,762,884 B2 | 7/2004 | Beystrum et al. |
| 6,931,778 B1 | 8/2005 | Nelson et al. |
| 6,950,243 B2 | 9/2005 | Wiese et al. |
| 7,051,469 B1 | 5/2006 | Pochapsky et al. |
| 7,269,920 B2 | 9/2007 | Staley, III |
| 7,307,793 B2 | 12/2007 | Ottney et al. |
| 7,319,557 B2 | 1/2008 | Tai |
| 7,333,270 B1 * | 2/2008 | Pochapsky et al. ........... 359/634 |
| 7,409,792 B2 | 8/2008 | Narcy et al. |
| 7,483,213 B2 | 1/2009 | Pochapsky |
| 7,870,688 B1 | 1/2011 | Dasiukevich |
| 7,978,330 B2 | 7/2011 | Reyes, Jr. et al. |
| 2007/0109638 A1 | 5/2007 | Tai |
| 2009/0051760 A1 | 2/2009 | Ottney |
| 2009/0095837 A1 | 4/2009 | Lindgren |
| 2009/0100735 A1 | 4/2009 | Schick et al. |
| 2009/0193704 A1 | 8/2009 | Pochapsky et al. |
| 2011/0157876 A1 | 6/2011 | Wang et al. |
| 2014/0110483 A1 | 4/2014 | Benson |

OTHER PUBLICATIONS

Written Opinion of the International Searching Authority for International Application No. PCT/US2011/046262, dated Mar. 29, 2012.
Patent Examination Report No. 1 regarding Australian Patent Application No. 2011285873, dated Jun. 18, 2014.

* cited by examiner

FUSED OPTIC

CROSS-REFERENCE TO RELATED APPLICATIONS

This application claims the benefit of U.S. Provisional Application No. 61/370,591, filed on Aug. 4, 2010. The entire disclosure of the above application is incorporated herein by reference.

FIELD

The present disclosure relates to sights and more particularly to an optical sight incorporating an imaging system.

BACKGROUND

This section provides background information related to the present disclosure which is not necessarily prior art.

Optical sights are conventionally used with firearms such as rifles to allow the shooter to more clearly see a target. Conventional optical sights include a series of lenses that magnify an image and provide a reticle that allows the shooter to align a magnified target relative to a barrel of the firearm. Proper alignment of the optical sight with the barrel of the firearm allows the shooter to align the barrel of the firearm and, thus, a projectile fired therefrom, with a target by properly aligning a magnified image of the target with the reticle pattern of the optical sight.

While conventional optical sights adequately magnify an image and properly align the magnified image with a barrel of a firearm, conventional optical sights do not provide an image visible at night, through smoke, fog, haze or through vegetation and/or walls. Furthermore, conventional optical sights are easily obscured in the visible range.

SUMMARY

This section provides a general summary of the disclosure, and is not a comprehensive disclosure of its full scope or all of its features.

An optical sight is provided and may include an optics train having at least one prism with a first surface, a display associated with the first surface to selectively supply the first surface with an image, and a processor in communication with the display to provide the display with the image. An infrared camera may be in communication with the processor and may provide the processor with thermal-energy data for use by the processor in generating the image.

An optical sight may further include a base unit selectively attached to the firearm and a modular unit in selective communication with the base unit and selectively attached to the base unit such that the base unit is disposed between the base unit and the firearm.

An optical sight may further include a base unit having at least one optical element operable to generate a magnified image of a target and a modular unit operable to transmit data to the base unit. A display may be associated with the base unit and may be operable to overlay the data from the modular unit over the magnified image. The display may be attached to the at least one optical element of the base unit.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
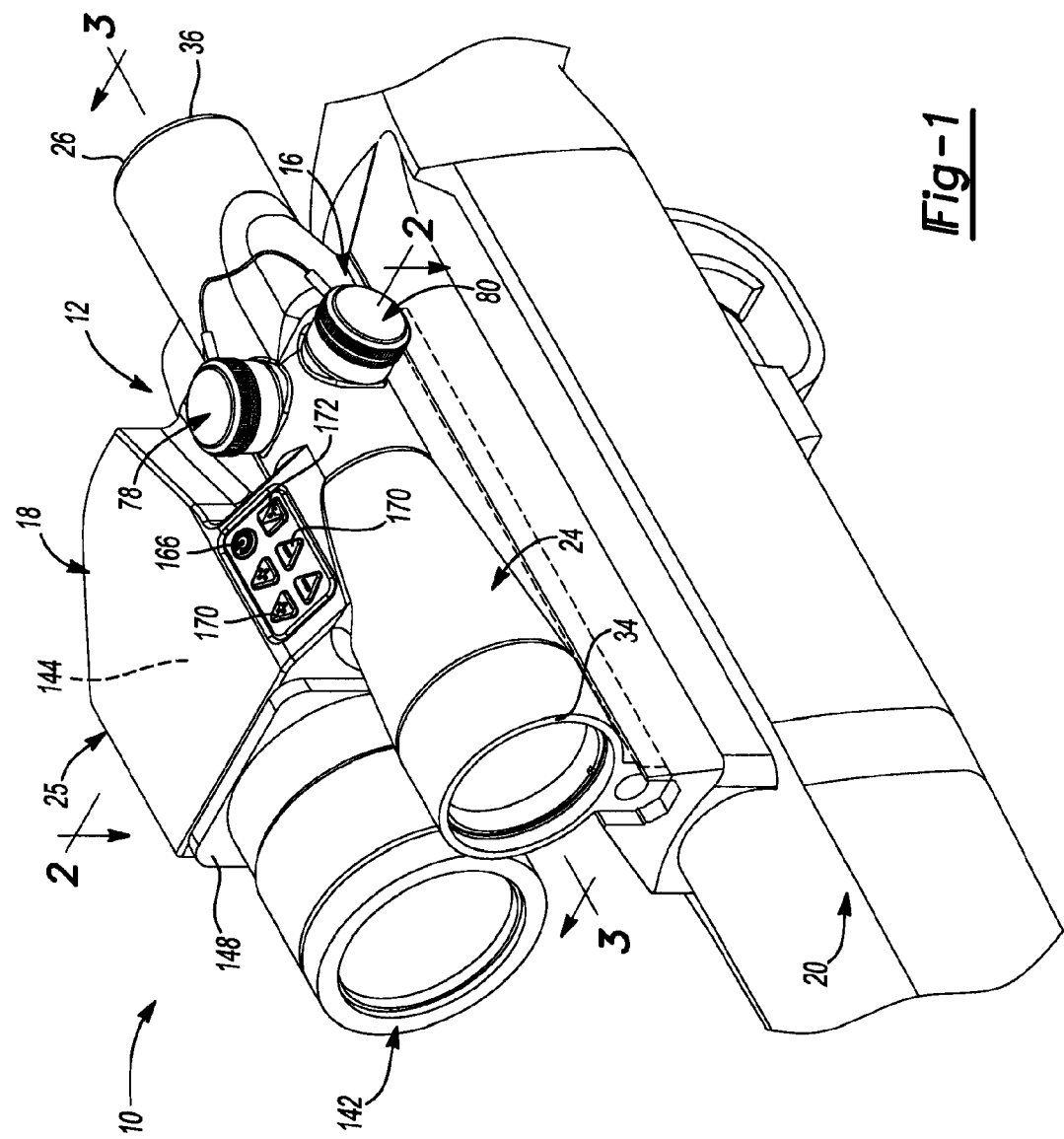
FIG. 1 is a perspective view of a sight in accordance with the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 72 degrees or at other orientations) and the spatially relative descriptors used herein interpreted accordingly.

With reference to the figures, an optical sight 10 is provided and may include a housing 12, an optics train 14, an adjustment system 16, and an imaging system 18. The housing 12 may be selectively attached to a firearm 20 and supports the optics train 14, adjustment system 16, and imaging system 18. The optics train 14 cooperates with the housing 12 to provide a magnified image of a target while the adjustment system 16 positions the optics train 14 relative to the housing 12 to properly align the optics train 14 relative to the firearm 20. The optics train 14 may display a reticle (not shown) for use in properly aligning the optical sight 10 with a target. The reticle may be a fixed-position reticle and may be illuminated via at least one of an optical fiber, light-emitting diode (LED), or Tritium lamp (none shown). The imaging system 18 may cooperate with the optics train 14 to provide a thermal image of a target that may overlay the reticle and a magnified image produced by the optics train 14 to concurrently provide the shooter with a reticle, a magnified image of a target, and a thermal image of a target.

Figure 2:
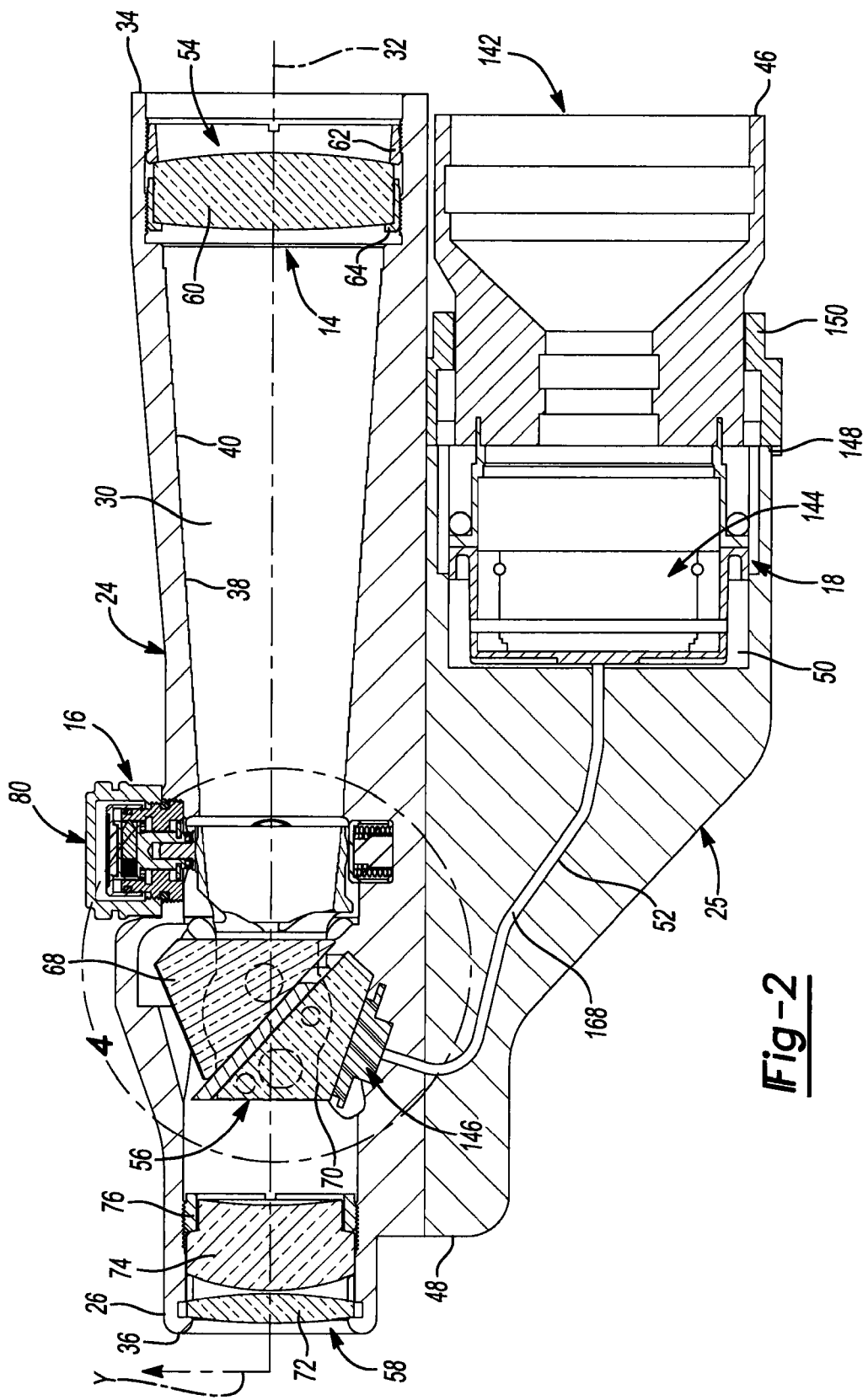
FIG. 2 is a cross-sectional view of the sight of FIG. 1 taken along line 2-2.
Figure 3:
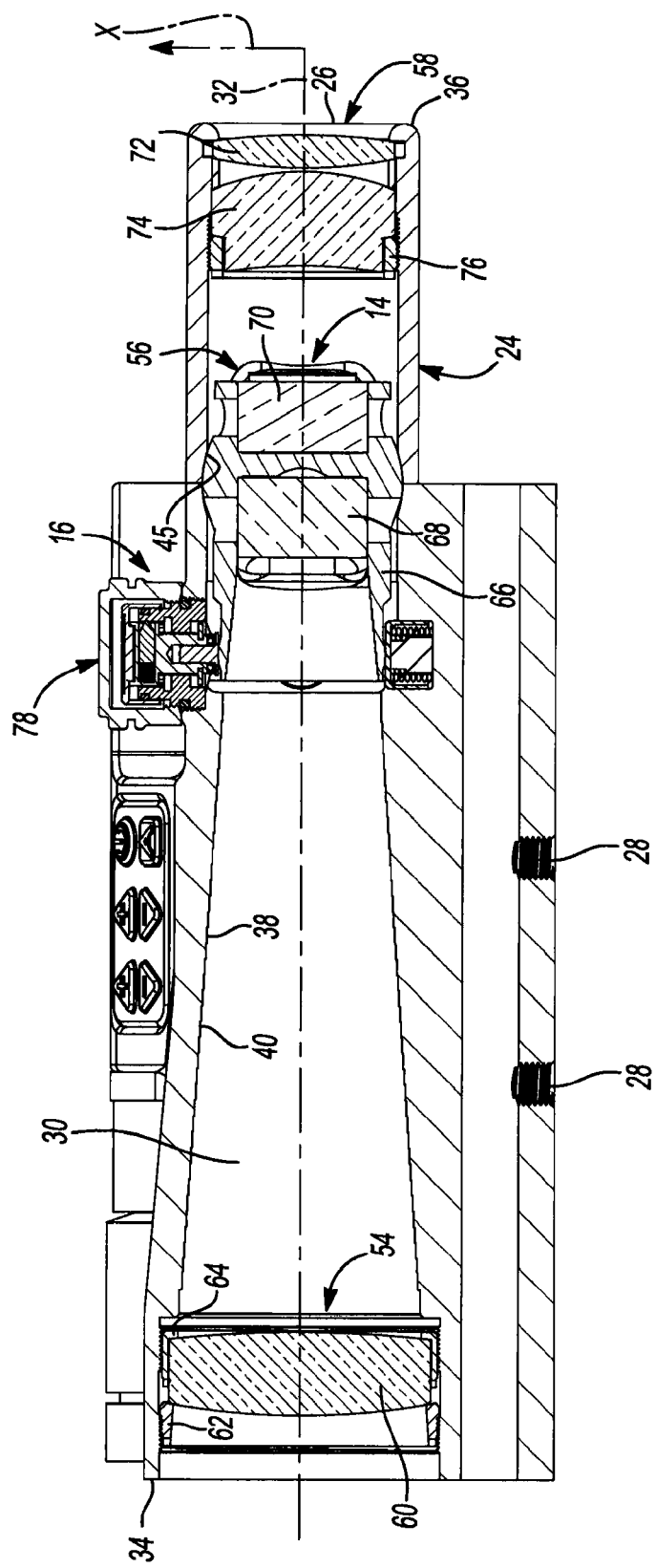
FIG. 3 is a cross-sectional view of the sight of FIG. 1 taken along line 3-3.

With reference to FIGS. 1-3, the housing 12 may include a first portion 24 supporting the optics train 14 and a second portion 25 supporting the imaging system 18. In one configuration, the first portion 24 and the second portion 25 include a unitary construction such that the first portion 24 is integrally formed with the second portion 25. While the first portion 24 is described as being integrally formed with the second portion 25, the first portion 24 may be separately formed from the second portion 25.

Regardless of the particular construction of the housing 12, the first portion 24 may include an eyepiece 26 and a series of threaded bores 28 (FIG. 3) for use in attaching the housing 12 to the firearm 20. The first portion 24 may also include an inner cavity 30 having a longitudinal axis 32 extending substantially along the optics train 14. A first end 34 of the first portion 24 includes a substantially circular shape and is in communication with the inner cavity 30 of the housing 12. A second end 36 is disposed generally on an opposite end of the first portion 24 from the first end 34 and similarly includes a generally circular cross section. A tapered bore 38 may be generally disposed between the first end 34 and second end 36 and may include a stepped surface 40 that defines a profile of the tapered bore 38.

The first end 34 of the first portion 24 includes an entrance pupil having a larger diameter than an exit pupil of the second end 36. The entrance pupil of the first end 34 defines how much light enters the optical sight 10 and cooperates with the exit pupil to provide the optical sight 10 with a desired magnification. For example, the entrance pupil may include a diameter that is substantially six (6) times larger than a diameter of the exit pupil. Such a configuration provides the optical sight 10 with a "6× magnification." While the exit pupil is described as being six times smaller than the entrance pupil, the exit pupil may be increased to facilitate alignment of the shooter's eye with the optical sight 10.

The first portion 24 supports the adjustment system 16 and may include a pair of bores 42, 44 (FIG. 5) that receive a portion of the adjustment system 16 therein. The first portion 24 may also include an inner arcuate surface 45 that cooperates with the adjustment system 16 to adjust a position of the reticle pattern relative to a target.

The second portion 25 supports the imaging system 18 and may include a first end 46, a second end 48, and a cavity 50 disposed between the first end 46 and the second end 48 and in communication with the first end 46. The second portion 25 may also include a passageway 52 extending between the cavity 50 and the first portion 24 to permit communication between the imaging system 18 and optics train 14.

With particular reference to FIGS. 2 and 3, the optics train 14 is shown to include an objective lens system 54, an image erector system 56, and an ocular lens system 58. The objective lens system 54 is disposed generally proximate to the first end 34 of the first portion 24 and may include a convex-convex lens 60. The lens 60 may be secured within the first end 34 of the first portion 24 via a first threaded retainer ring 62, a second threaded retainer ring 64, and/or adhesive to position and attach the lens 60 relative to the first portion 24 of the housing 12.

Figure 6:
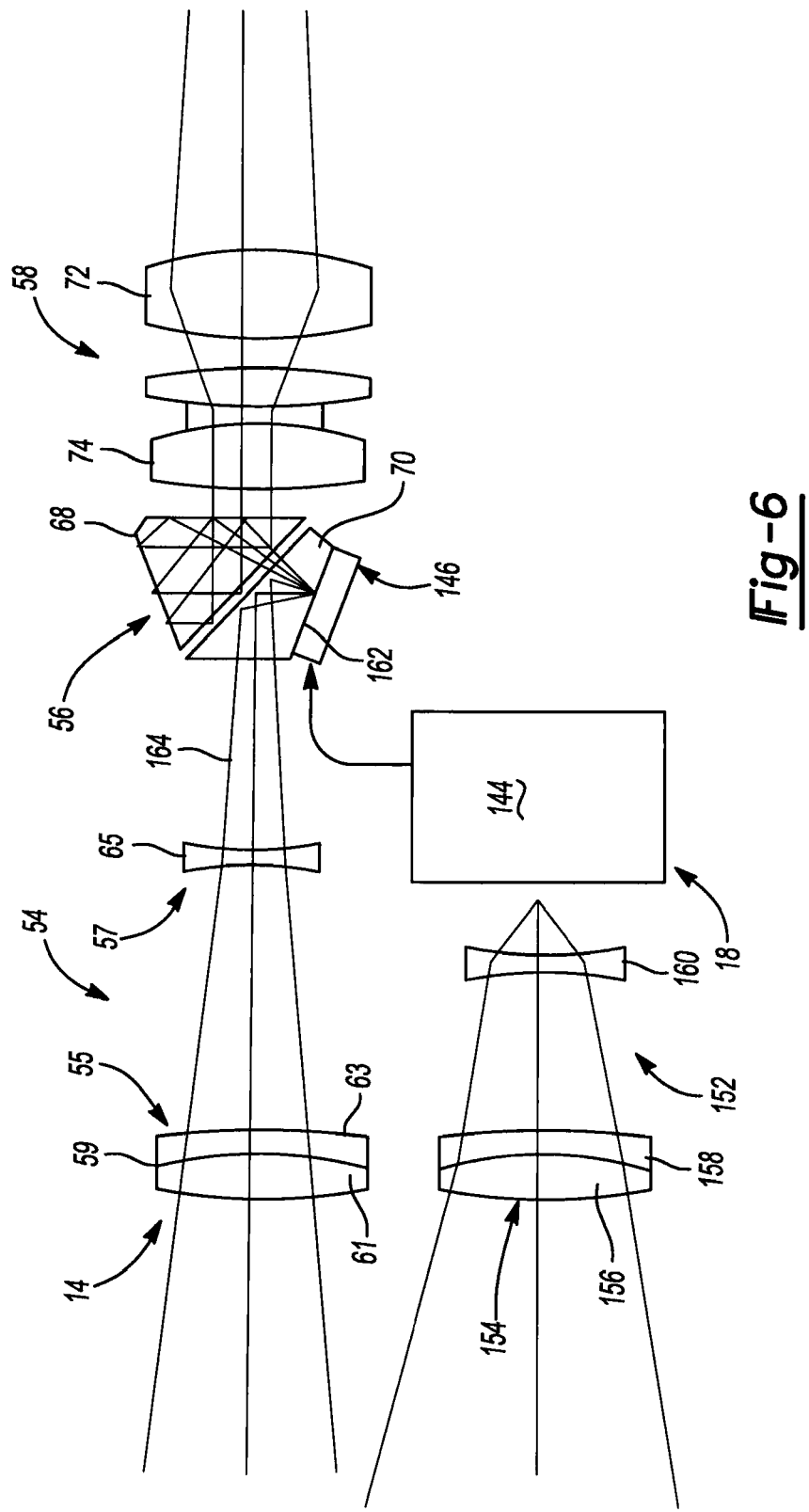
FIG. 6 is a schematic representation of an optics train and imaging system of the sight of FIG. 1.
Figure 7:
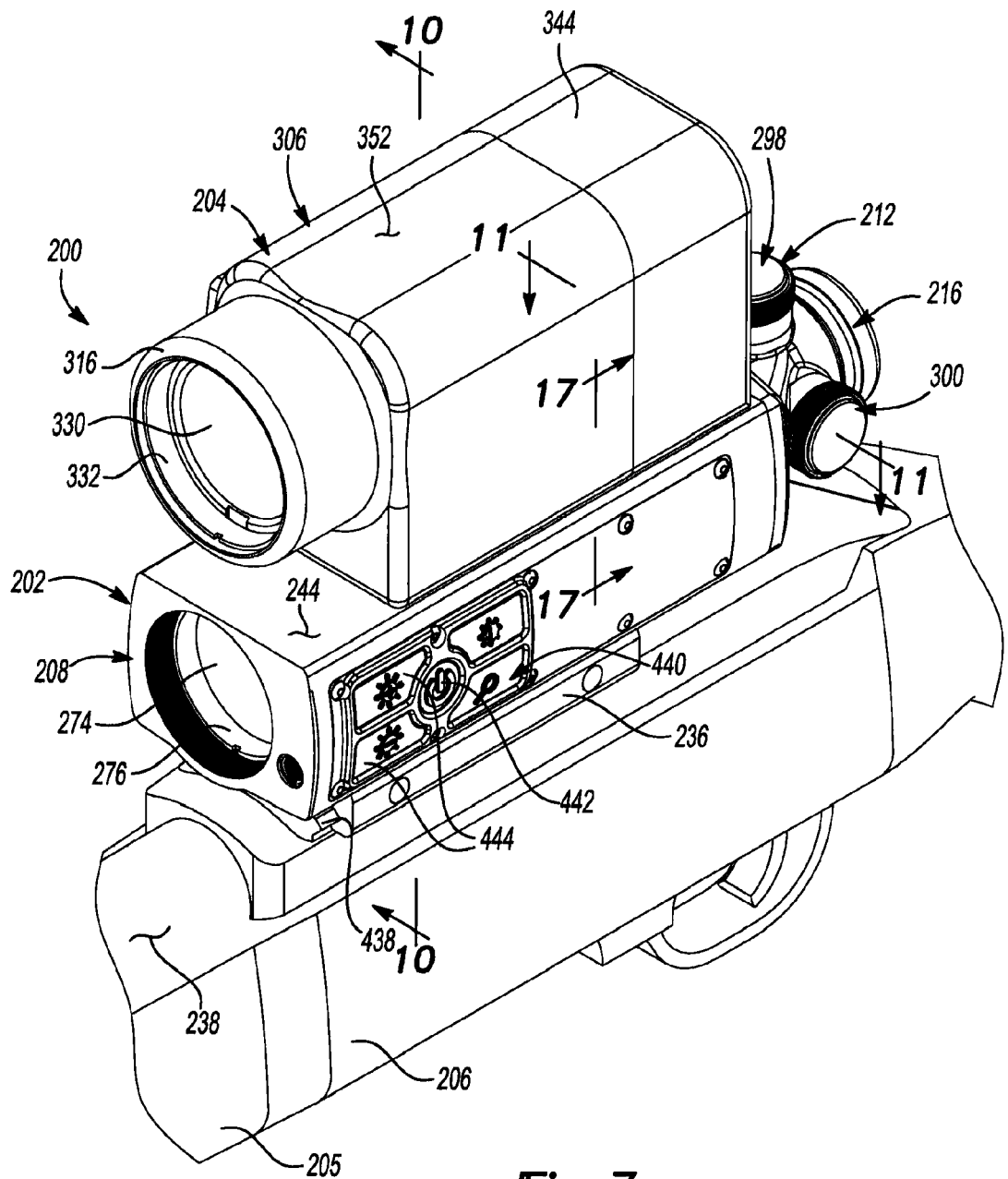
FIG. 7 is a perspective view of a sight in accordance with the principles of the present disclosure incorporating a selectively removable module.

While the objective lens system 54 is described as including a convex-convex lens 60, the objective lens system 54 could alternatively include a telephoto objective construction having a front positive power group 55 and a rear negative power group 57 (FIG. 6). The front positive power group 55 is disposed generally proximate to the first end 34 of the first portion 24 and may include a doublet lens 59 having a substantially convex-convex lens 61 and a substantially concave-convex lens 63 secured together by a suitable adhesive. The rear negative power group 57 is disposed generally between the front positive power group 55 and the second end 36 of the first portion 24 and may include a convex-convex lens 65.

Regardless of the particular construction of the objective lens system 54, the image erector system 56 is disposed within the first portion 24 of the housing 12 generally between the objective lens system 54 and the ocular lens system 58. The image erector system 56 may include a housing 66, a roof prism 68, and a mirror prism 70, which cooperate to form a Pechan prism assembly. The image erector system 56 cooperates with the objective lens system 54 and ocular lens system 58 to properly orient an image of a sighted target relative to the housing 12 and, thus, the firearm 20. For example, when an image is received at the first end 34 of the first portion 24, the image travels along the longitudinal axis 32 of the first portion 24 and travels along a light path of the Pechan prism assembly prior to being viewed at the eyepiece 26. The image erector system 56 provides the overall shape and size of the reticle pattern displayed the eyepiece 26. The reticle may be etched on a portion of the mirror prism 70 and may be overlaid over a magnified image of a target.

The image from the image erector system 56 is received by the ocular lens system 58 disposed proximate to the eyepiece 26. The ocular lens system 58 is disposed generally on an opposite end of the optical sight 10 from the objective lens system 54 and may include an eyepiece lens 72, which may be of a bi-convex singlet or substantially doublet-convex type lens, and a doublet ocular lens 74. Hereinafter, the eyepiece lens 72 will be described as doublet-convex eyepiece lens 72. The doublet ocular lens 74 may include a substantially doublet-convex lens and a substantially doublet-concave lens secured together by a suitable adhesive (FIG. 6). The doublet-convex eyepiece lens 72 and doublet ocular lens 74 may be held in a desired position relative to the eyepiece 26 of the housing 12 via a threaded retainer ring 76. While threaded retainer ring 76 is disclosed, the doublet-convex eyepiece lens 72 and doublet ocular lens 74 could alternatively and/or additionally be attached to the eyepiece 26 of the housing 12 using an adhesive.

Figure 4:
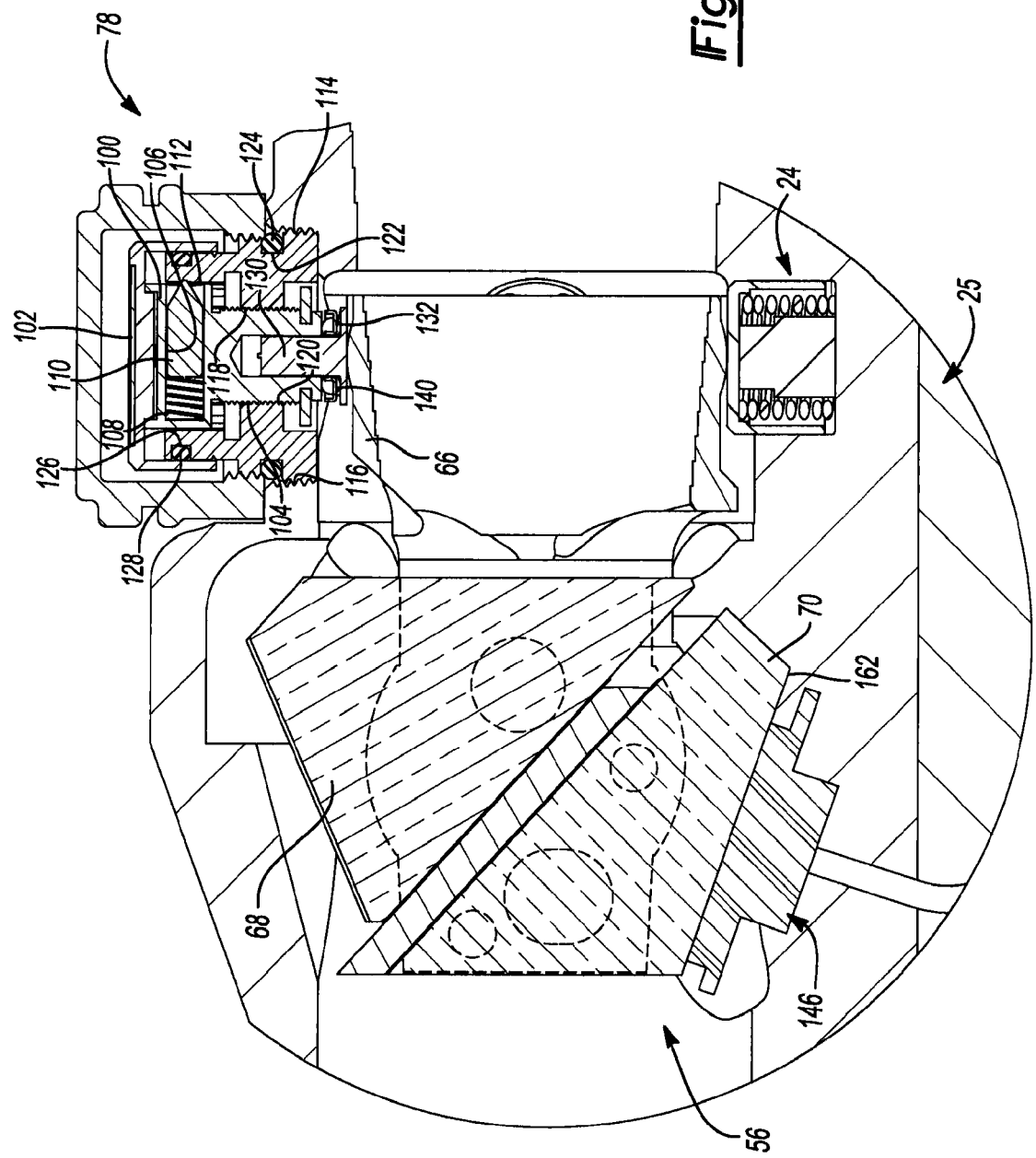
FIG. 4 is a more detailed cross-sectional view of an adjustment mechanism and image erector of the sight of FIG. 1.
Figure 5:
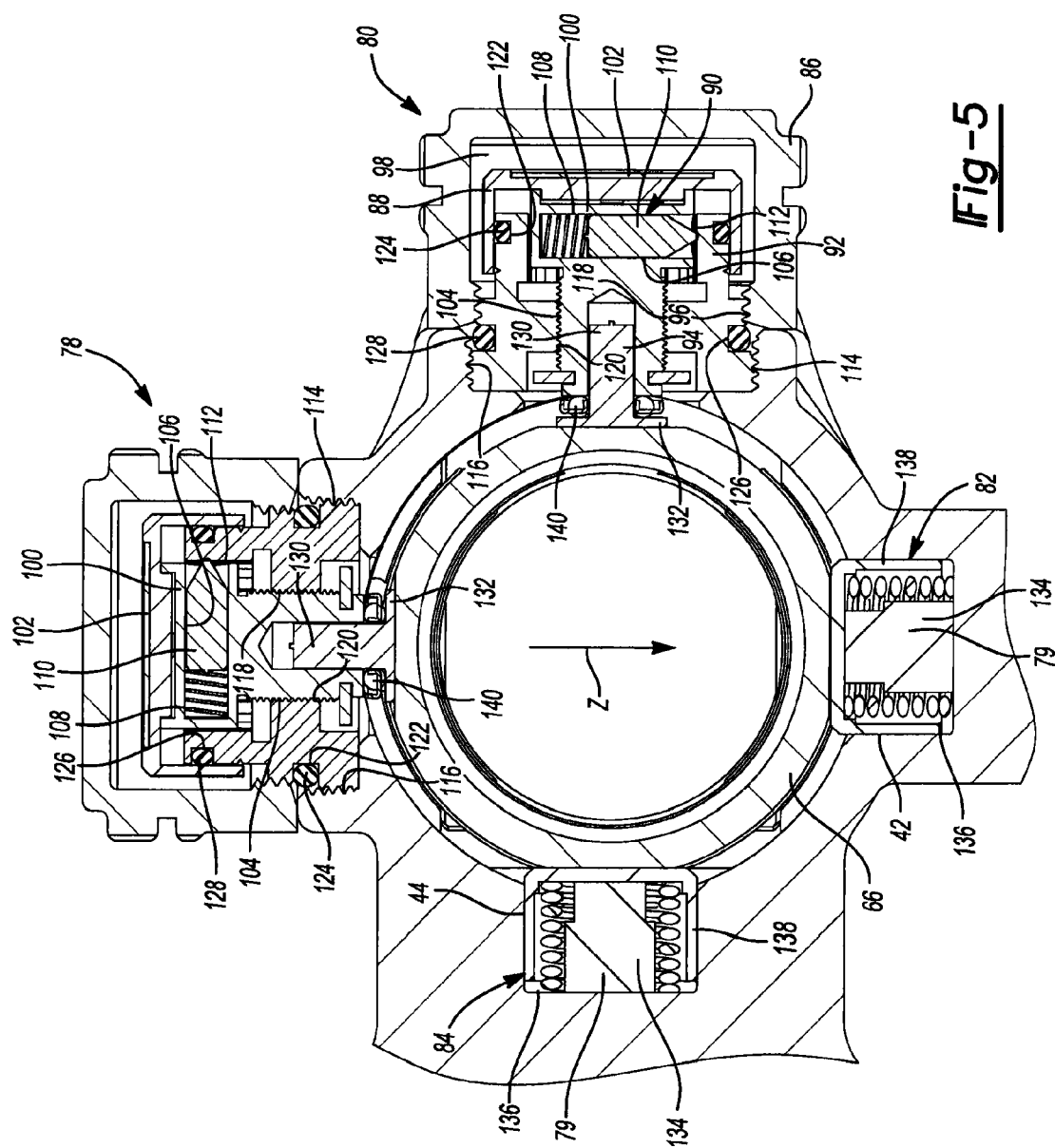
FIG. 5 is a cross-sectional view of an adjustment mechanism for use with the sight of FIG. 1.

With particular reference to FIGS. 4 and 5, the adjustment system 16 is shown to include a first adjustment assembly 78 and a second adjustment assembly 80 respectively associated with a first biasing assembly 82 and a second biasing assembly 84 and respectively received within bores 42, 44 of the housing 12. The adjustment assemblies 78, 80 cooperate with the biasing assemblies 82, 84 to selectively move the housing 66 of the image erector system 56 relative to the housing 12. Movement of the housing 66 of the image erector system 56 relative to the housing 12 similarly moves the roof prism 68 and mirror prism 70 relative to the housing 12 and therefore may adjust a position of the reticle pattern relative to the housing 12. Such adjustments of the reticle pattern relative to the housing 12 may be used to align the reticle relative to the firearm 20 to account for windage and elevation.

As shown in FIGS. 2, 3, and 5, the first adjustment assembly 78 and first biasing assembly 82 cooperate to rotate the housing 66 of the image erector system 56 relative to the housing 12 to adjust an elevation of the reticle. Rotation of the housing 66 causes the reticle to move in a direction substantially perpendicular to axis 32, as schematically represented by arrow X in FIG. 3. Similarly, the second adjustment assembly 80 and second biasing assembly 84 cooperate with each other to move the housing 66 of the image erector system 56 and reticle relative to the housing 12. Such movement of the reticle relative to the housing 12 may be performed to adjust for windage to properly align the reticle relative to the housing 12 and, thus, the optical sight 10 with the firearm 20. Such movement of the reticle is substantially perpendicular to axis 32 and to arrow Y, as schematically represented by arrow Y in FIG. 2.

Because the first adjustment assembly 78 is substantially identical to the second adjustment assembly 80 and the first biasing assembly 82 is substantially identical to the second biasing assembly 84, a detailed description of the second adjustment assembly 80 and second biasing assembly 84 is foregone.

With reference to FIGS. 4 and 5, the first adjustment assembly 78 is shown to include a cap 86, an adjustment knob 88, a detent assembly 90, a hollow adaptor 92, and an engaging pin 94. The cap 86 is selectively attachable to the housing 12 and may include a series of threads 96 for mating engagement with the hollow adaptor 92. The cap 86 includes an inner volume 98 that generally receives the adjustment knob 88 and a portion of the hollow adaptor 92. While the cap 86 is shown and described as including the series of threads 96 that selectively attach the cap 86 to the housing 12, the cap 86 could include any feature that allows for selective attachment of the cap 86 to the housing 12 such as, for example, a snap fit and/or mechanical fastener.

The adjustment knob 88 is disposed generally within the inner volume 98 of the cap 86 and may include a plug 100 rotatably attached to the hollow adaptor 92 and a top cap 102 attached to the plug 100 via a series of fasteners 101 (FIG. 4) and/or adhesive. The plug 100 may include a threaded extension 104 that is matingly received with the hollow adaptor 92 such that rotation of the plug 100 and top cap 102 relative to the hollow adaptor 92 causes the plug 100 and top cap 102 to move towards or away from the housing 12, depending on the direction of rotation of the plug 100 relative to the hollow adaptor 92.

The detent assembly 90 may be located in a radial cross bore 106 formed through the plug 100 and may include a spring 108 that imparts a biasing force on a detent pin 110. The bias imparted on the detent pin 110 by the spring 108 urges the detent pin 110 outwardly from the cross bore 106 and into engagement with a side wall of the hollow adaptor 92. A plurality of axially extending grooves 112 may be circumferentially located at spaced-apart intervals around an inner surface of the hollow adaptor 92 such that upon threadably advancing or retracting the plug 100, discernible physical and/or audible 'clicks' can be sensed by the operator, as the detent pin 110 moves into an adjacent groove 112 to facilitate calibration of the optical sight 10.

The hollow adaptor 92 is attached to the housing 12 and may include a series of external threads 114 that are matingly received within a threaded bore 116 of the housing 12. While the hollow adaptor 92 is described and shown as being attached to the housing 12 via a threaded connection, the hollow adaptor 92 could be attached to the housing 12 via any suitable means such as, for example, an epoxy and/or press fit.

The hollow adaptor 92 may include a central bore 118 having a series of threads 120 that matingly receive the threaded extension 104 of the plug 100. As described above, when a force is applied to the adjustment knob 88 such that the plug 100 and threaded extension 104 rotate relative to the hollow adaptor 92, the plug 100 and threaded extension 104 move towards or away from the housing 12 due to engagement between the threaded extension 104 of the plug 100 and the threads 120 of the hollow adaptor 92. The hollow adaptor 92 may also include at least one recess 122 formed on an outer surface thereof for receiving a seal 124 to seal a connection between the hollow adaptor 92 and the housing 12. A similar recess 126 may be formed in the hollow adaptor 92 proximate to the top cap 102 of the adjustment knob 88 and may similarly receive a seal 128 to seal a connection between the hollow adaptor 92 and the adjustment knob 88. The recesses 122, 126 may be formed integrally with the hollow adaptor 92 and/or may be machined in an outer surface of the hollow adaptor 92. The seals 124, 128 may be any suitable seal such as, for example, an O-ring.

Engaging pin 94 is received generally within the threaded extension 104 of the plug 100 and includes an attachment portion 130 rotatably received within the threaded extension 104 of the plug 100 and an engagement portion 132 extending from a distal end of the attachment portion 130. The threaded extension 104 is fixed for movement with the plug 100.

The engagement portion 132 extends from the attachment portion 130 and is in contact with the housing 66 of the image erector system 56. The first biasing assembly 82 biases the housing 66 of the image erector system 56 into engagement with the engagement portion 132 of the engaging pin 94. The first biasing assembly 82 may include a biasing member 134 disposed within a bore 136 of the housing 12. The biasing member 134 may be in contact with the housing 66 of the image erector system 56 or, alternatively, a cap 138 may be disposed generally between the biasing member 134 and the housing 66 of the image erector system 56. In either configuration, the biasing member 134 applies a force to the housing 66 of the image erector system 56, urging the housing 66 into engagement with the engagement portion 132 of the engaging pin 94. The biasing member 134 may be any suitable spring such as, for example, a coil spring or a linear spring.

Because the housing 66 of the image erector system 56 is biased into engagement with the engagement portion 132 of the engaging pin 94, movement of the engaging pin 94 relative to the hollow adaptor 92 causes movement of the housing 66 of the image erector system 56 relative to the housing 12. Positioning ball bearings 140 generally between the engagement portion 132 and a bottom portion of the hollow adaptor 92 may dampen such movement of the engaging pin 94 relative to the hollow adaptor 92. The ball bearings 140 may provide a seal between the engagement portion 132 and the hollow adaptor 92 and may also dampen movement of the engaging pin 94 when the engaging pin 94 is moved toward and away from the housing 12 to ensure quiet operation of the adjustment system 16.

The first adjustment assembly 78 may additionally include a sensor 79 disposed within the bore 42 of the housing 12. The sensor 79 may include a potentiometer that measures the degree of movement of the cap 138 relative to the housing 12. Determining the relative movement between the cap 138 and the housing 12 likewise determines the amount of movement of the housing 66 of the image erector system 56 relative to the housing 12, thereby providing an indication as to how much the image erector system 56 and, thus, the roof prism 68 and mirror prism 70 have been moved relative to the housing 12. Such information may be utilized to determine the degree of adjustment of the image erector system 56 and, thus, the reticle, relative to a known position. For example, the sensor 79 may provide data indicative of the degree of movement of the image erector system 56 and, thus, the reticle relative to a setting established during manufacturing of the optical sight 10.

With continued reference to FIGS. 4 and 5, operation of the adjustment system 16 will be described in detail. The cap 86 is first removed from engagement with the housing 12 to adjust the elevation of the reticle relative to the housing 12. In one configuration, the cap 86 is threadably attached to the housing 12. Therefore, to remove the cap 86 from engagement with the housing 12, a force is applied to the cap 86 to rotate the cap 86 relative to the housing 12. Once the cap 86 is sufficiently rotated relative to the housing 12, the cap 86 may be removed from engagement with the housing 12.

Removal of the cap 86 from engagement with the housing 12 exposes the top cap 102 of the adjustment knob 88. Exposing the adjustment top cap 102 allows a force to be applied to the plug 100 of the adjustment knob 88 via the top cap 102. A rotational force may be applied generally to the top cap 102 of the adjustment plug 100 to rotate the plug 100 and threaded extension 104 relative to the hollow adaptor 92. Rotation of the plug 100 and threaded extension 104 relative to the hollow adaptor 92 causes the threaded extension 104 to move relative to the central bore 118 of the hollow adaptor 92.

As described above, the central bore 118 may include threads 120 that engage the threaded extension 104. Therefore, as the plug 100 and threaded extension 104 are rotated relative to the housing, the plug 100, top cap 102, and threaded extension 104 are caused to move towards or away from the hollow adaptor 92 due to engagement between the threads 120 of the central bore 118 and the threaded extension 104, depending on the direction of rotation of the threaded extension 104. The engaging pin 94 is attached to the threaded extension 104 of the adjustment knob 88 and therefore moves with the plug 100, top cap 102, and threaded extension 104 when the plug 100, top cap 102, and threaded extension 104 move relative to the hollow adaptor 92.

When the force applied to the top cap 102 causes the threaded extension 104 to move towards the hollow adaptor 92, the engaging pin 94 applies a force in a "Z" direction (FIG. 5) to the housing 66 of the image erector system 56. Application of a force in the Z direction to the housing 66 of the image erector system 56 causes the housing 66 to move against the bias imparted on the housing 66 by the first biasing assembly 82. Such movement of the housing 66 causes concurrent movement of the reticle in the Z direction relative to the housing 12 and therefore adjusts the elevation of the reticle relative to the housing 12.

When a force is applied to the top cap 102 in an opposite direction, the threaded extension 104 and engaging pin 94 move away from the hollow adaptor 92 in a direction substantially opposite to the Z direction. The housing 66 of the image erector system 56 similarly moves in a direction substantially opposite to the Z direction due to the force imparted on the housing 66 by the biasing member 134 of the first biasing assembly 82. As noted above, regardless of movement of the threaded extension 104 and engaging pin 94 in a direction generally opposite to the Z direction, the housing 66 of the image erector system 56 is maintained in contact with the engagement portion 132 of the threaded extension 104 due to the force imparted on the housing 66 of the image erector system 56 by the biasing member 134 of the first biasing assembly 82.

During adjustment of the housing 66 of the image erector system 56 in the direction generally opposite to or along the Z direction, the sensor 79 may provide data indicative of the amount of movement of the cap 138 and, thus, the housing 66 relative to a known position. Such information may be used to determine a position of the reticle relative to the known position, which may be used to properly adjust the imaging system 18 to ensure that when the reticle is trained on a target, the imaging system 18 is likewise trained on the target.

Once the elevation of the reticle is adjusted relative to the housing 12, the cap 86 may be positioned over the adjustment knob 88 and hollow adaptor 92 and may be reattached to the housing 12. Attachment of the cap 86 to the housing 12 prevents further manipulation of the adjustment knob 88 and therefore aids in preventing further adjustment of the elevation of the reticle until the cap 86 is once again removed from the housing 12. In other words, the cap 86 prevents inadvertent forces from being applied to the top cap 102 causing the plug 100 and threaded extension 104 from rotating relative to the hollow adaptor 92 when an elevational adjustment is not desired. A similar approach may be performed on the second adjustment assembly 80 and second biasing assembly 84 to adjust the windage by moving the reticle relative to the housing 12 in a direction substantially perpendicular to the Z direction. Further, the sensor 79 associated with the second adjustment assembly 80 may be used to determine a position of the reticle during and after adjustment of the housing 66 in a direction substantially perpendicular to the Z direction for use in aligning the imaging system 18 with the reticle such that when the reticle is trained on a target, the imaging system 18 is likewise trained on the target.

With particular reference to FIGS. 1-4 and 6, the imaging system 18 is shown to include a thermal camera 142, a processor 144, and a display 146. The thermal camera 142 may be disposed within the second portion 25 of the housing 12 such that the thermal camera 142 at least partially extends into the cavity 50. As such, the thermal camera 142 is disposed proximate to an end 148 of the second portion 25 and is retained thereto by a collar 150. The thermal camera 142 may include an optics train (FIG. 6) that focuses thermal energy associated with environmental conditions surrounding the optical sight 10 and/or at a target location for use by the processor 144 in generating an image representative of the thermal energy. While the imaging system 18 is described as including a thermal camera 142, the imaging system 18 could incorporate any infrared camera to provide an image representative of heat radiated by objects proximate to the optical sight 10 and/or at a target location.

The optics train 152 may include a thermal objective lens and, specifically, may include a doublet 154 having a convex lens 156 and a concave-convex lens 158, as well as a concave-concave lens 160. Regardless of the particular construction, the optics train 152 focuses thermal energy from the environment generally surrounding the optical sight 10 and/or proximate to a desired location (i.e., a target location). The focused thermal energy is directed via the optics train 152 to the processor 144.

The focused thermal energy is received by the processor 144 and is used by the processor 144 in generating an image representative of the thermal energy of the environment proximate to the optical sight 10 or at a desired location. The image generated by the processor 144 may be viewable at the eyepiece 26, as the image generated by the processor 144 may be overlayed in the field of view and along the optics train 14 of the optical sight 10 via the display 146. The processor 144 may trim, expand, or otherwise adjust the image to allow the image generated by the processor 144 to be properly overlaid with the magnified imaged generated by the optics train 14.

The display 146 may be a liquid crystal display (LCD), a light-emitting diode (LED), an organic light-emitting diode (OLED), or a laser projection, and may be attached to a surface 162 (FIG. 4) of the mirror prism 70. While the LED and OLED are described as being light-emitting diodes, the LED and OLED could be any light-emitting device. As shown in FIG. 6, attaching the display 146 to the surface 162 of the mirror prism 70 allows the display 146 to project an image into the field of view 164 such that an image generated by the display 146 is overlayed on a magnified image of a target generated by the optics train 14 disposed within the first portion 24 of the housing 12.

In one configuration, the surface 162 of the mirror prism 70 includes a dichroic coating. As such, the surface 162 reflects visible light except for a particular band having a specific wavelength. As such, an image transmitted from the display 146 transmits through the dichroic coating at a particular wavelength and may be overlayed with the magnified image generated by the optics train 14. While the surface 162 of the mirror prism 70 is described as including a dichroic coating, the dichroic coating could be removed to allow the display 146 to transmit multiple colors into the field of view 164. Eliminating the dichroic coating could be achieved by adjusting the prescription of the optics train 14 and, more specifically, the prescription of the roof prism 68 and/or mirror prism 70 along with enhancing the total internal reflection (i.e., type of glass utilized in manufacturing the lenses of the optics train 14, index of air, and angle of prisms 68, 70). Eliminating the dichroic coating allows the display 146 to be a color display and therefore allows multiple colors from the display 146 to be viewed at the eyepiece 26.

Regardless of the particular construction of the optics train 14, the display 146 overlays an image representative of the thermal energy proximate to the optical sight 10 and/or at a desired location within the field of view 164. As such, the thermal image is overlayed over the magnified image generated by the optics train 14, which allows the magnified image and overlayed thermal image to be concurrently viewed at the eyepiece 26 along with the reticle. In essence, positioning the display 146 on the surface 162 of the mirror prism 70 provides the thermal image created by the processor 144 to be inserted "in line" with the magnified image generated by the optics train 14.

With particular reference to FIGS. 1, 2 and 6, operation of the optical sight 10 will be described in detail. While the optical sight 10 is described as including an imaging system 18, the optical sight 10 could be used to magnify an image without use of the imaging system 18 during conditions where a thermal image is not required. For example, the optical sight 10 may be used as a day scope and therefore may only provide a magnified image of a target at the eyepiece 26 when used in the daylight or in other well-lit locations. Under such conditions, use of a thermal image in conjunction with a magnified image may not be required, as targets are likely visible during daylight or in otherwise well-lit locations. Under such conditions, the optical sight 10 may be used to magnify an image via the optics train 14 without concurrently overlaying a thermal image of the surrounding environment.

When the optical sight 10 is used in low-light conditions such as when using at night or in heavy foliage (i.e., a dense jungle), use of a thermal image in conjunction with a magnified image may provide a shooter with the ability to better identify a target. Under such conditions, the imaging system 18 may be energized to allow the imaging system 18 to overlay a thermal image over the magnified image generated by the optics train 14. Specifically, a shooter may depress a power button 166 (FIG. 1) to initiate the thermal camera 142, processor 144, and display 146. Once the power button 166 is depressed and the thermal camera 142, processor 144, and display 146 are energized, the thermal camera 142 continually scans the environment and provides the processor 144 with focused thermal energy for use by the processor 144 in generating a thermal image.

The thermal image generated by the processor 144 may be transmitted to the display 146 via a cable 168 (FIG. 2) extending through the passageway 52 formed in the first portion 24 and the second portion 25 of the housing 12. The image received by the display 146 is transmitted through the dichroic coating formed on the surface 162 of the mirror prism 70 at a particular wavelength to allow the image to be viewed concurrently with the magnified image generated by the optics train 14 at the eyepiece 26. The image allows the thermal image to be concurrently displayed with the magnified image of the target, which allows the shooter to view the magnified image concurrently with an image representative of the thermal energy at the target location.

Because the dichroic coating only allows the display 146 to transmit through the dichroic coating at a particular wavelength, the thermal image may only be viewable in a single color. However, if the dichroic coating is removed and the internal reflection of the prisms 68, 70 is enhanced, as described above, the display 146 may be able to transmit light at more than one wavelength through the mirror prism 70 to allow a multi-colored image to be displayed at the eyepiece 26 along with the magnified image generated by the optics train 14. Allowing the display 146 to display a multi-colored image allows the processor 144 to utilize different colors to provide the shooter with information as to the degree of heat at a desired location to allow the shooter to differentiate between different targets. For example, the processor 144 may assign the color red to a target emitting a large amount of heat and may assign the color blue to a target emitting a lower amount of heat to allow the shooter the ability to differentiate between various targets.

During operation, a shooter may adjust the display for brightness and clarity via a series of buttons 170. While the optical sight 10 is described as including a power button 166 and a series of buttons 170 allowing a shooter to adjust operation of the imaging system 18, the optical sight 10 may additionally include an input button 172 that allows a shooter to selectively display other data with respect to a desired target such as, for example, range to target or current elevation.

With particular reference to FIGS. 7-18, an optical sight 200 is provided and may include a base unit 202 and a modular unit 204. The modular unit 204 may be selectively attached to the base unit 202 to allow the modular unit 204 to provide information to the base unit 202 that may be used by a shooter in identifying a target and properly aligning the base unit 202 relative to a target. As described above with respect to the optical sight 10, aligning a sight such as the base unit 202 with a target likewise aligns a barrel 205 of a firearm 206 to which the base unit 202 and modular unit 204 are attached with the target, thereby permitting a projectile (not shown) fired from the firearm 206 to strike the target at a desired location.

The base unit 202 may be a sight that provides a shooter with a magnified image of a target. Alternatively or additionally, the base unit 202 may include a visible-spectrum camera, a non-visible-spectrum camera, a range estimator, a ballistics compensator, a wind speed sensor, a forward observation/spotting scope, and/or binoculars. The base unit 202 may incorporate any or all of the foregoing features to provide the base unit 202 with a variety of functions. For example, the base unit 202 may be a day optic incorporating a range estimator and ballistic compensator to provide a shooter with a range-to-target, as well as a simulated aim point based on ballistic characteristics, such as is shown and described in Assignee's commonly owned U.S. patent application Ser. No. 13/112,365 filed on May 20, 2011, the disclosure of which is hereby incorporated herein by reference.

The modular unit 204 may include a visible spectrum optical sensor/device, a non-visible spectrum optical sensor/device, a range estimator, a ballistics compensator, a wind-speed sensor, a data management device, a data transfer device, a power-management device, a visible designator/illuminator, a non-visible designator/illuminator, an output device, environmental sensors, a forward observation/spotting scope, and/or binoculars. As described, the modular unit 204 may incorporate any combination of the foregoing features to provide the shooter—via the base unit 202—with additional information regarding the target and/or environmental conditions. For example, the modular unit 204 may include a range estimator, a ballistics compensator, and a wind-speed sensor that may be used by the modular unit 204 to determine a range-to-target, ballistics information, and wind speed at or near the modular unit 204 to allow the modular unit 204 to generate a simulated-aim point, as described in Assignee's commonly owned U.S. patent application Ser. No. 13/112,365 filed on May 20, 2011, the disclosure of which is hereby incorporated herein by reference.

While the base unit 202 may be a sight such as a so-called day optic and may perform various functions (i.e., range estimation, ballistics compensation, etc.) and while the modular unit 204 may include a variety of functions (i.e., range estimation, ballistics compensation, data management, etc.), the base unit 202 will be described and shown hereinafter as being a sight that provides a magnified image of a target and the modular unit 204 will be described and shown as being a non-visible spectrum camera or so-called thermal camera that provides a thermal image of a target to the base unit 202.

The base unit 202 may include a housing 208, an optics train 210, and an adjustment system 212. The housing 208 may be selectively attached to the firearm 206 and supports the optics train 210 and adjustment system 212.

The housing 208 may include a main body 214 and an eyepiece 216 that cooperate to provide the housing 208 with an internal cavity 218. The main body 214 may include a first end 220, a second end 222, and a tapered bore 224 extending generally between the first end 220 and the second end 222. The first end 220 may include a substantially circular shape and may include at least one threaded portion 226 to retain a portion of the optics train 210 within the main body 214. The second end 222 is disposed at an opposite end of the main body 214 from the first end 220 and may include a projection 228 that interacts with the eyepiece 216 to position and retain the eyepiece 216 relative to the main body 214. The tapered bore 224 may include a stepped surface 230 that defines a profile of the tapered bore 224.

The main body 214 may additionally include a series of threaded bores 232 that selectively receive fasteners 234 to attach the main body 214 to a rail 236. The rail 236 may include a shape that facilitates positioning, alignment, and retention of the main body 214 at a top surface 238 of the firearm 206 (FIG. 7) and may include at least one set screw 240 that fixes a position of the rail 236 and, thus, the main body 214 relative to the firearm 206 when tightened.

The main body 214 may include a pair of threaded bores 242 located proximate to a top surface 244 of the main body 214 and at an opposite side from the threaded bores 232. The threaded bores 242 may be spaced apart and separated from one another and may respectively receive fasteners 246 and collars 248 therein. The collars 248 may be separately formed from the fasteners 246 and may provide the assembled fasteners 246 and collars 248 with a desired width and/or shape. Alternatively, the fasteners 246 may be integrally formed with the collars 248 to achieve a desired width and/or shape in a single component. Regardless of the particular construction of the fasteners 246, the fasteners 246 may be threadably received within the threaded bores 242 of the main body 214 and may be used to selectively retain the modular unit 204 in a desired position relative to the base unit 202 proximate to the top surface 244 of the main body 214, as will be described in greater detail below.

The top surface 244 may include a pair of detents 250 (FIGS. 9 and 17) as well as a recess 252. The recess 252 may be located generally between the detents 250 such that the recess 252 is concurrently located between the detents 250 and the threaded bores 242. The recess 252 may receive a pin connector 254 having a series of pin slots 256 supported therein. The pin connector 254 may be slidably received within the recess 252 to permit movement of the pin connector 254 and, thus, the pin slots 256, relative to the main body 214 in a direction substantially perpendicular to the top surface 244 of the main body 214. A seal 258 may be located within the recess 252 to permit movement of the pin connector 254 relative to the main body 214 while concurrently providing a seal between the pin connector 254 and the main body 214 to prevent debris from entering the housing 208. Further, the seal 258 may be located between the pin connector 254 and the main body 214 to exert a force on the pin connector 254 in an effort to bias the pin connector 254 in a direction substantially away from the top surface 244.

The eyepiece 216 may be attached to the main body 214 by a series of fasteners 217 (FIG. 9) and may include a recess 260 that matingly receives the projection 228 of the main body 214. Interaction between the projection 228 of the main body 214 and the recess 260 of the eyepiece 216 retains and positions the eyepiece 216 relative to the main body 214. The eyepiece 216 may include an opening 262 that supports a portion of the optics train 210 therein. The eyepiece 216 may additionally include an aperture 264 and a pocket 266 located on an opposite side of the eyepiece 216 from the aperture 264. The aperture 264 and pocket 266 may respectively receive portions of the adjustment system 212 therein to permit movement of the adjustment system 212 relative to the eyepiece 216 during use.

Figure 10:
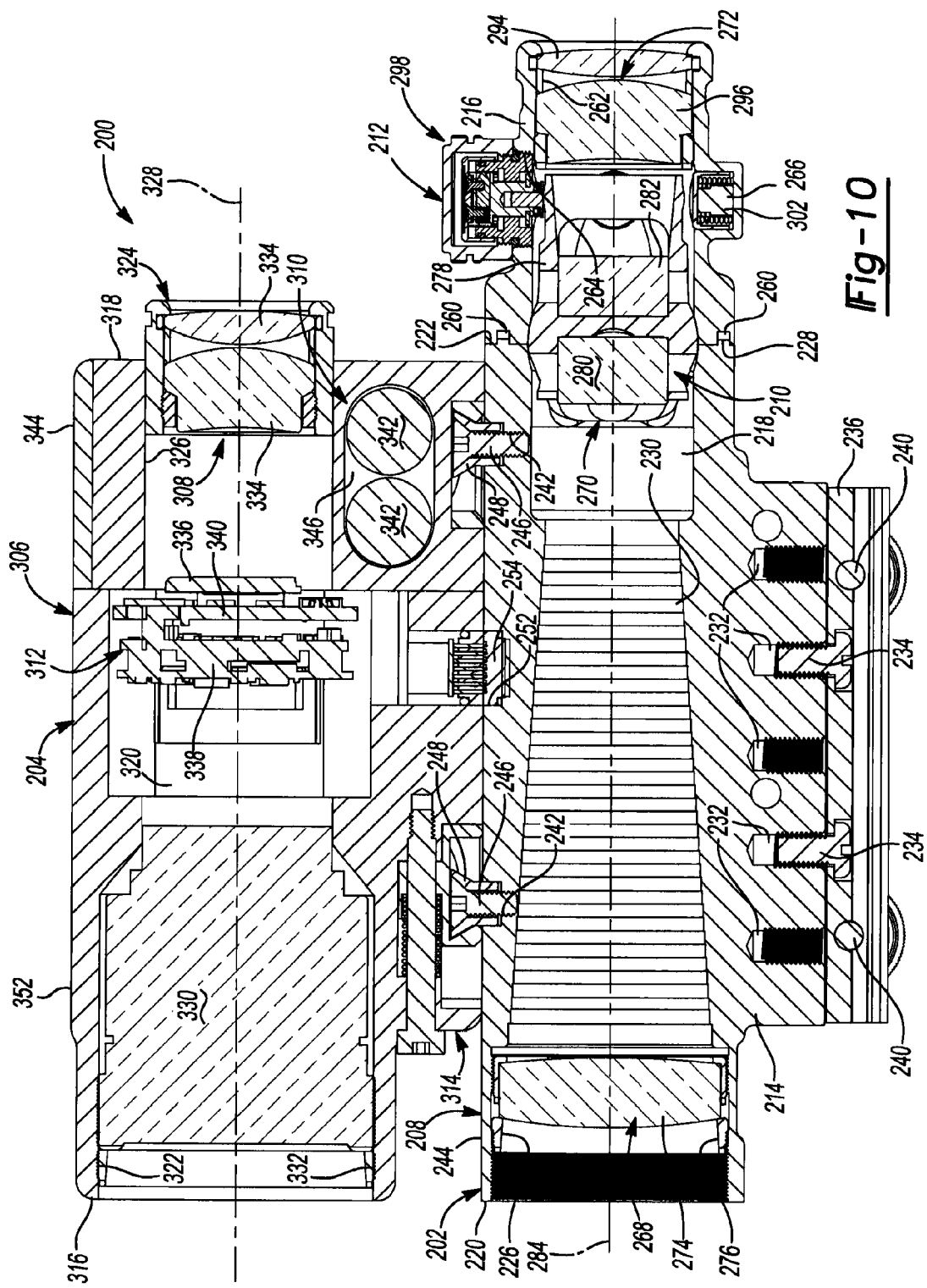
FIG. 10 is a cross-sectional view taken along line 10-10 of FIG. 9.

With particular reference to FIG. 10, the optics train 210 is shown to include an objective lens system 268, an image erector system 270, and an ocular lens system 272. The objective lens system 268 is disposed generally proximate to the first end 220 of the main body 214 and may include a convex-convex lens 274. The lens 274 may be retained within the first end 220 by a threaded retainer ring 276 and/or adhesive, which engages the threaded portion 226 of the first end 220.

The image erector system 270 is located generally within the internal cavity 218 of the housing 208 and may span between the main body 214 and the eyepiece 216. The image erector system 270 may include a housing 278, a roof prism 280, and a mirror prism 282, which cooperate to form a Pechan prism assembly. As with the optical sight 10, the image erector system 270 cooperates with the objective lens system 268 and the ocular lens system 272 to properly orient an image of a cited target relative to the housing 208 and, thus, the firearm 206. For example, when an image is received at the first end 220 of the main body 214, the image travels along a longitudinal axis 284 of the housing 208 and travels along a light path of the Pechan prism assembly prior to being viewed at the eyepiece 216.

Figure 11:
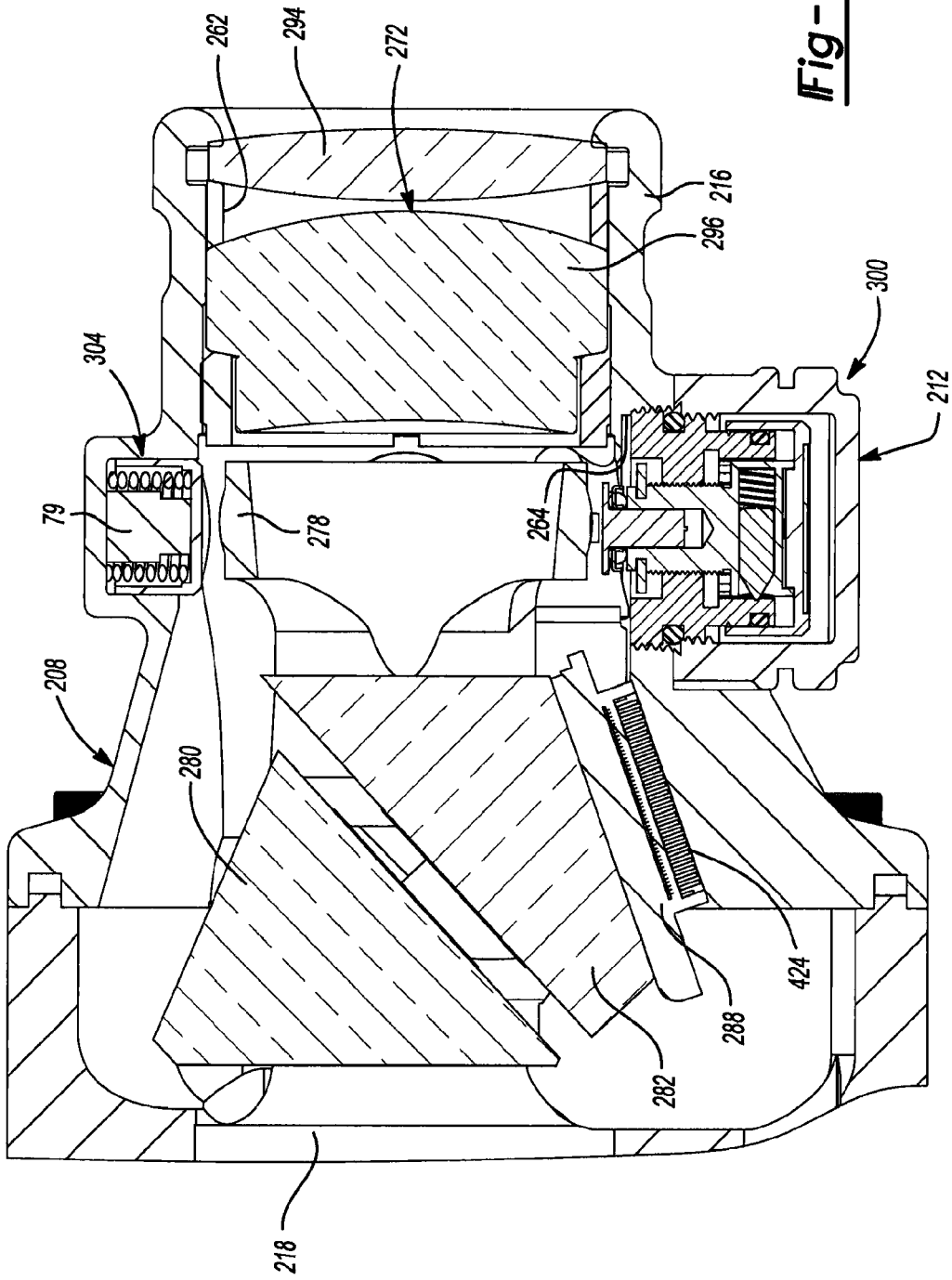
FIG. 11 is a partial cross-sectional view taken along line 11-11 of FIG. 7.

The image erector system 270 may provide the overall shape and size of a reticle 286 (FIG. 18) displayed at the eyepiece 216. Specifically, the reticle 286 may be etched on a portion of the mirror prism 282 and may be overlayed over a magnified image of a target. While the mirror prism 282 is described as including an etched portion defining the overall shape and size of the reticle 286, the reticle 286 could alternatively be overlayed over a magnified image of a target by a display 288 (FIG. 11).

Figure 18:
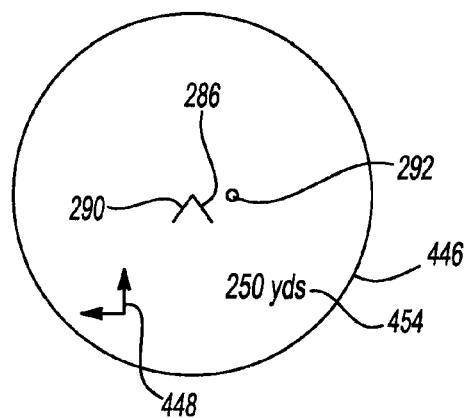
FIG. 18 is a schematic view of a field-of-view of the sight of FIG. 7.

The display 288 may be attached to the mirror prism 282 in a similar fashion as the display 146 associated with the optical sight 10 and may provide the optics train 210 with an image to be overlayed over a magnified image of a target. The display 288 may be one of a liquid crystal display (LCD) or organic light emitting diode (OLED), which may generate the reticle 286. If the display 288 provides the reticle 286 at the mirror prism 282, the reticle 286 could include virtually any shape or color and could therefore be modified by the shooter. For example, as shown in FIG. 18, the reticle 286 could include a chevron shape 290 or a circular shape 292, for example. Regardless of the particular shape and color of the reticle 286, the display 288 may transmit an image of the reticle 286 to the shooter via the mirror prism 282. The reticle 286 may be viewed by the shooter at the eyepiece 216 via the ocular lens system 272 and may be overlayed over a magnified image of a target for use by the shooter in properly aligning the base unit 202 and, thus, the firearm 206 relative to the target.

The image from the image erector system 270 is received by the ocular lens system 276 disposed within the eyepiece 216 and, thus, is viewed by the shooter at the eyepiece 216. The ocular lens system 276 is disposed generally at an opposite end of the housing 208 from the objective lens system 268 and may include an eyepiece lens 294, which may be of a bi-convex singlet or substantially doublet-convex type lens, and a doublet ocular lens 296.

The eyepiece lens 294 of the base unit 202 and/or the lenses 334 or of the eyepiece 324 of the modular unit 204 may be formed from a hard and scratch-resistant material. For example, the lenses 294, 334 may be formed from Magnesium Spinel ($MgAl_2O_4$). Forming the lenses 294, 334 from Magnesium Spinel provides the lenses with a degree of hardness and scratch resistance, which allows the lenses 294, 334 to be used in a sandy or otherwise abrasive environment.

With continued reference to FIGS. 10 and 11, the adjustment system 212 is shown as being supported by the eyepiece 216. The adjustment system 212 may include a first adjustment assembly 298 and a second adjustment assembly 300 respectively associated with a first biasing assembly 302 and a second biasing assembly 304. The adjustment assemblies 298, 300 respectively cooperate with the biasing assemblies 302, 304 to selectively move the housing 278 of the image erector system 270 relative to the housing 208 of the base unit 202 to adjust a position of the roof prism 280 and mirror prism 282 relative to the housing 208. If the reticle 286 is etched into the mirror prism 282, movement of the mirror prism 282 relative to the housing 208 likewise adjusts a position of the reticle 286 relative to the housing 208. If, on the other hand, the reticle 286 is not disposed on the mirror prism 282 but, rather, is generated by the display 288, movement of the mirror prism 282 likewise causes movement of the reticle 286 relative to the housing 208, as the display 288 may be fixed for movement with the mirror prism 282. In either configuration, movement of the mirror prism 282 relative to the housing 208 likewise causes movement of the reticle 286 relative to the housing 208.

As shown in FIGS. 7, 9-11, the first adjustment assembly 298, second adjustment assembly 300, first biasing assembly 302, and second biasing assembly 304 are integrated into the eyepiece 216 of the base unit 202. Positioning the adjustment assemblies 298, 300 and biasing assemblies 302, 304 in the eyepiece 216 moves the adjustment assemblies 298, 300 closer to the shooter, thereby allowing the shooter to easily make adjustments to the position of the reticle 286 during use. Further, moving the adjustment assemblies 298, 300 and biasing assemblies 302, 304 into the eyepiece 216 and in a direction toward the shooter allows the optical sight 200 to have a compact design, whereby the modular unit 204 may be attached to the base unit 202 on top of the base unit 202 rather than in front of the base unit 202. Positioning the modular unit 204 on top of the base unit 202 moves the weight of the modular unit 204 from an area in front of the base unit 202 to an area on top of the base unit 202, thereby improving the overall balance of the firearm 206 when the base unit 202 and modular unit 204 are attached thereto. In other words, moving the modular unit 204 to a location on top of the base unit 202 rather than positioning the modular unit 204 in front of the base unit 202 moves the center of gravity of the combined modular unit 204 and base unit 202 toward the shooter and, as a result, improves the overall balance and feel of the firearm 206 when in use.

The first adjustment assembly 298 and first biasing assembly 302 may be used to align the reticle 286 relative to the housing 206 to account for elevation. Similarly, the second adjustment assembly 300 and second biasing assembly 304 may cooperate to adjust a position of the reticle 286 relative to the housing 208 to account for windage. Because the first adjustment assembly 298 and second adjustment assembly 300 are identical to the first adjustment assembly 78 and second adjustment assembly 80 of the optical sight 10 and, further, because the first biasing assembly 302 and the second biasing assembly 304 are identical to the first biasing assembly 82 and second biasing assembly 84 of the optical sight 10, a detailed description of the first adjustment assembly 298, second adjustment assembly 300, first biasing assembly 302, and second biasing assembly 304 is foregone. Like reference numerals are used hereinafter and in the drawings to identify like components.

With particular reference to FIGS. 7, 8, 10, and 12-17, the modular unit 204 is shown to include a housing 306, an optics train 308, a power supply 310, and a controller 312. The housing 306 generally supports the optics train 308, power supply 310, and controller 312 and may be selectively attached to the base unit 202 via an attachment assembly 314 (FIGS. 12-16).

The housing 306 may include a first end 316, a second end 318, and an internal cavity 320 disposed generally between the first end 316 and the second end 318. The first end 316 may include a substantially circular shape and may include a series of threads 322. The second end 318 is disposed at an opposite end of the housing 306 than the first end 316 and may receive an eyepiece 324 therein. The eyepiece 324 may be received within an aperture 326 of the housing 306 to position a portion of the optics train 308 relative to the housing 306.

The optics train 308 may extend along a longitudinal axis 328 of the housing 306 and may include a first lens 330 received generally at the first end 316 of the housing 306. The first lens 330 may be retained within the housing 306 by a threaded retainer 332 that matingly engages the threads 322 of the housing 306. The optics train 308 may additionally include a pair of lenses 334 that are disposed in and supported by the eyepiece 324 relative to the housing 306. The lenses 334 may cooperate with the first lens 330 to provide a thermal image of a target to a shooter generally at the eyepiece 324. Specifically, the first lens 330 may be a thermal objective lens that focuses thermal energy from the environment generally surrounding the modular unit 204 and/or proximate to a desired target and directs the focused thermal energy to the controller 312. The controller 312 generates an image representative of the thermal energy of the environment proximate to the modular unit 204 and/or target and generates an image that may be viewable at the eyepiece 324.

The controller 312 may generate an image representative of the thermal energy of the environment proximate to the modular unit 204 and may display the image on a display 336 located generally within the internal cavity 320 of the housing 306. The image displayed on the display 336 may be viewed by the shooter through the lenses 334 located within the eyepiece 324. In one configuration, the eyepiece may include a collapsible eyepiece boot or other cover (neither shown) that prevents an image from being viewed at the eyepiece 324 when the modular unit 204 is attached to the base unit 202. Alternatively or additionally, the controller 312 may prevent the display 336 from generating the image when the modular unit 204 is attached to the base unit 202.

The controller 312 may include a driver board 338 and a graphics processing unit (GPU) 340 that cooperate to generate the image representative of the thermal energy of the environment proximate to the modular unit 204 and/or target. Once generated, the driver board 338 may transmit the image to the display 336 when the modular unit 204 is removed from the base unit 202 and may transmit the image to the base unit 202 when the modular unit 204 is attached to the base unit 202, as will be described in greater detailed below.

Figure 8:
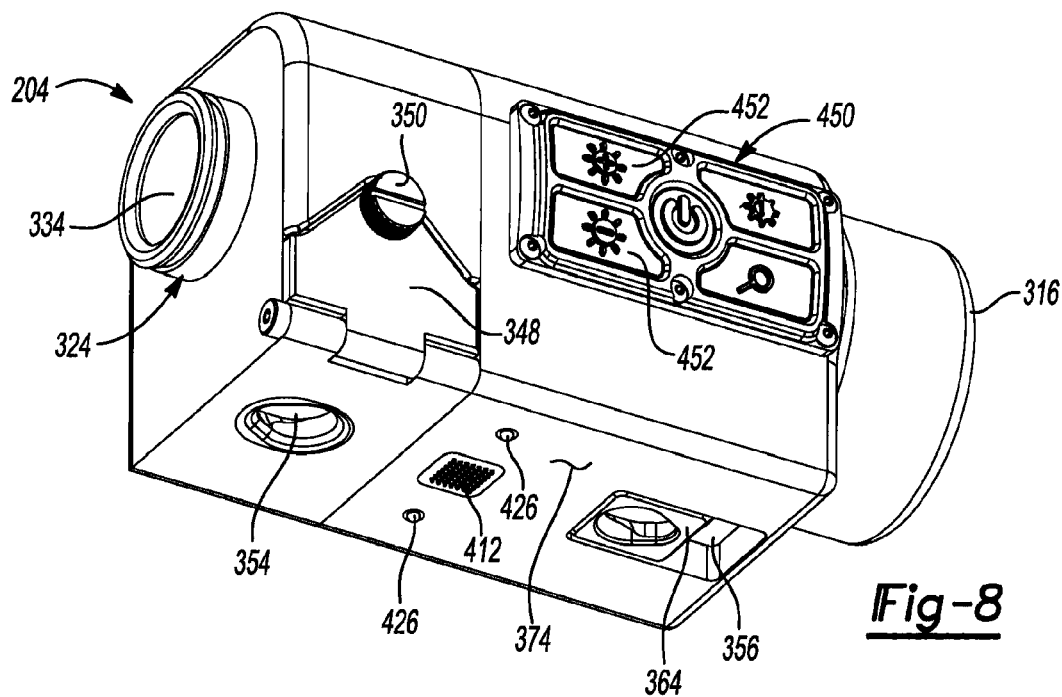
FIG. 8 is a bottom perspective view of the module of FIG. 7.
Figure 9:
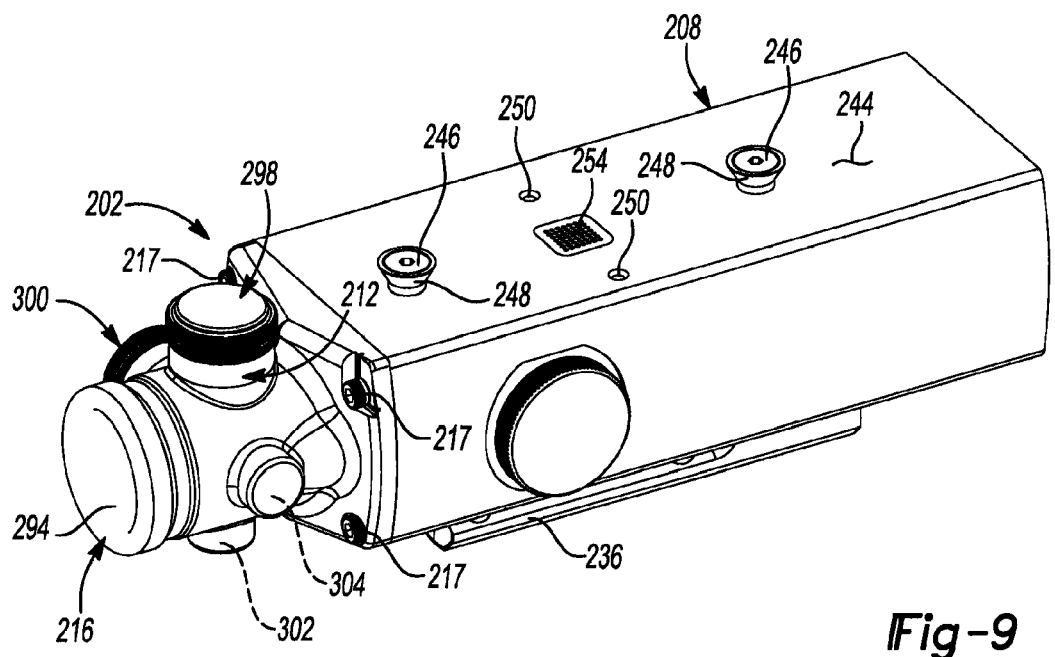
FIG. 9 is a top perspective view of the sight of FIG. 7.

With particular reference to FIGS. 8 and 10, the power supply 310 may include a series of batteries 342 and/or a photovoltaic cell 344. The batteries 342 may be received within a housing 346 which may be accessible via a hinged door 348 (FIG. 8). Specifically, the door 348 may be rotatably supported by the housing 306 and may be selectively secured to the housing via a fastener 350 to permit selective access to the batteries 342 from an area external to the housing 306. The photovoltaic cell 344 may be located proximate to a top surface 352 of the housing 306 to allow the photovoltaic cell 344 to capture as much solar energy as possible, thereby allowing the photovoltaic cell 344 to generate as much electrical energy as possible.

The batteries 342 and photovoltaic cell 344 may be in communication with the controller 312 to allow the controller 312 to supply power to the base unit 202 and modular unit 204 based on environmental conditions. Specifically, if the controller 312 will utilize power from the photovoltaic cell 344 to the extent there is sufficient solar power to allow the photovoltaic cell 344 to generate enough power for both the base unit 202 and modular unit 204. The controller 312 will supplement the power supplied by the photovoltaic cell 344 with power from the batteries 342 when ambient conditions are such that the photovoltaic cell 344 cannot generate sufficient electrical energy to power the base unit 202 and the modular unit 204. For example, when operating in dark or dimly lit conditions, the photovoltaic cell 344 will likely not be able to generate enough electrical energy to power both the base unit 202 and the modular unit 204. Under such conditions, the controller 312 will supply power from the batteries 342 to supplement or replace the energy provided by the photovoltaic cell 344. Once ambient light conditions are such that sufficient energy can be generated by the photovoltaic cell 344, the controller 312 will reduce the power supplied by the batteries 342 and rely on the energy provided by the photovoltaic cell 344 in an effort to increase the lifespan of the batteries 342. The photovoltaic cell 344 may additionally be used not only to power the modular unit 204 and/or base unit 202 but, also, could be used to recharge the batteries 342 when ample solar energy is available.

With particular reference to FIGS. 12-16, the attachment assembly 314 is shown to include a first pocket 354, a second pocket 356, and a slide mechanism 358. The first pocket 354 may include a retention feature 360 having an engagement surface 362. The second pocket 356 is spaced apart from the first pocket 354 and may slidably support at least a portion of the slide mechanism 358 therein.

The slide mechanism 358 may include a locking element 364 slidably received within the second pocket 356, a fastener 366, and a biasing element 368. The fastener 366 may be threadably received within a bore 367 of the housing 306 and may be slidably attached to the locking element 364. The locking element 364 may include an engagement surface 370 and a projection 372, whereby the projection 372 extends generally away from a bottom surface 374 of the modular unit 204 and slidably receives an outer surface 376 of the fastener 366. Engagement between the projection 372 and the outer surface 376 of the fastener 366 may guide movement of the locking element 364 relative to the housing 306 within the second pocket 356.

Figure 12:
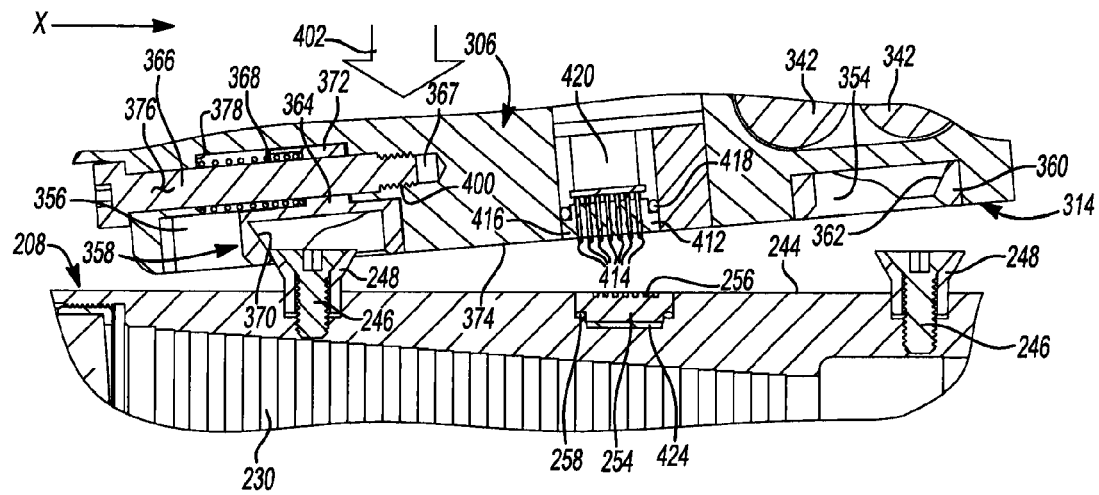
FIG. 12 is a partial cross-sectional view of the sight and module of FIG. 7 showing the module being moved toward the sight during installation of the module on the sight.

The biasing element 368 may be disposed generally around the outer surface 376 of the fastener 366 and may engage the projection 372 of the locking element 364 to bias the locking element 364 in the X direction shown in FIG. 12. Specifically, the biasing element 368 may act on a surface 378 of the housing 306 and may act on the projection 372 to bias the locking element 364 in the X direction.

In one configuration, the fastener 366 is fixedly attached to the housing 306 by engaging a threaded portion 400 of the fastener 366 with the bore 367 of the housing 306. Once installed, the fastener 366 essentially positions the biasing element 368 between the surface 378 of the housing 306 and the projection 372 of the locking element 364. The fastener 366 may be rotated relative to the housing 306 to increase or decrease the compression of the biasing element 368 and, therefore, the force exerted on the locking element 364. Specifically, the fastener 366 may be driven into the bore 367 in the X direction to increase the spring constant of the biasing element 368, thereby increasing the force required to move the locking element 364 in a direction substantially opposite to the X direction shown in FIG. 12. Conversely, the locking element 364 may be moved in a direction substantially opposite to the X direction to decrease the compression of the biasing element 368, thereby reducing the force required to move the locking element 364 in a direction substantially opposite to the X direction shown in FIG. 12.

The attachment assembly 314 cooperates with the fasteners 246 and collars 248 associated with the base unit 202 to selectively attach the modular unit 204 to the base unit 202. The modular unit 204 is first positioned relative to the base unit 202 by applying a force on the modular unit 204 to move the modular unit 204 towards the base unit 202 in a direction indicated by arrow 402 (FIG. 12). Upon sufficient movement of the modular unit 204 toward the base unit 202 in the direction identified by arrow 402, the locking element 364 is positioned relative to the fastener 246 and collar 248 associated with the second pocket 356 such that the collar 248 contacts the engagement surface 370 of the locking element 364.

Figure 13:
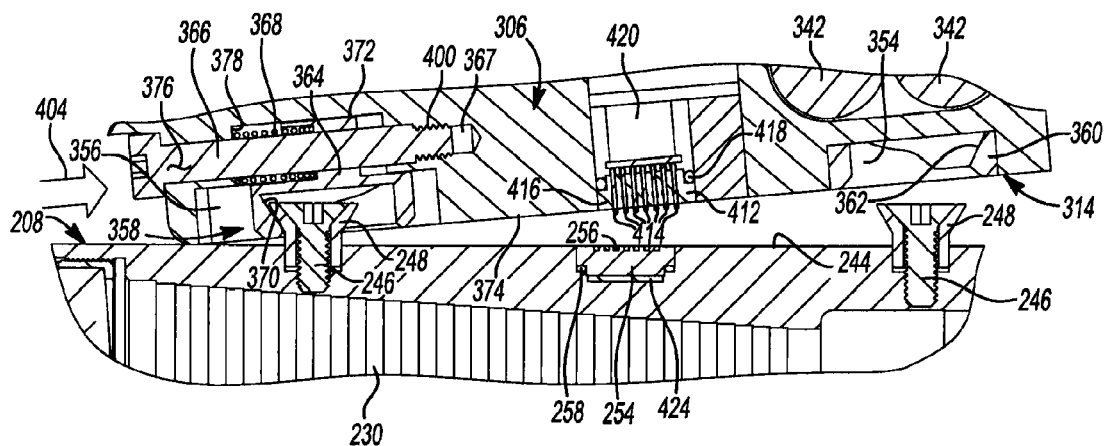
FIG. 13 is a partial cross-sectional view of the sight and module of FIG. 7 showing movement of the module relative to the sight during installation of the module on the sight.

Once the collar 248 contacts the engagement surface 370 of the locking element 364, a force may be applied to the modular unit 204 in a direction identified by arrow 404 (FIG. 13). Applying a force on the modular unit 204 in the direction identified by arrow 404 causes the fastener 246—via collar 248—to apply a force on the locking element 364 to move the locking element 364 in a direction substantially opposite to the direction identified by arrow 404. Movement of the locking element 364 in a direction substantially opposite to the direction identified by arrow 404 causes the biasing element 368 to be compressed between the projection 372 of the locking element 364 and the surface 378 of the housing 306.

Figure 14:
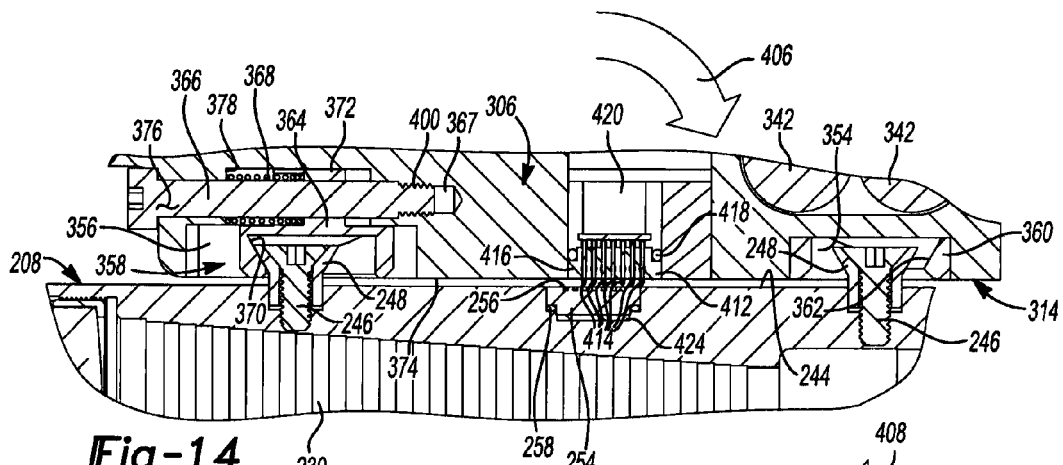
FIG. 14 is a partial cross-sectional view of the sight and module of FIG. 7 showing movement of the module toward the sight during installation of the module on the sight.
Figure 15:
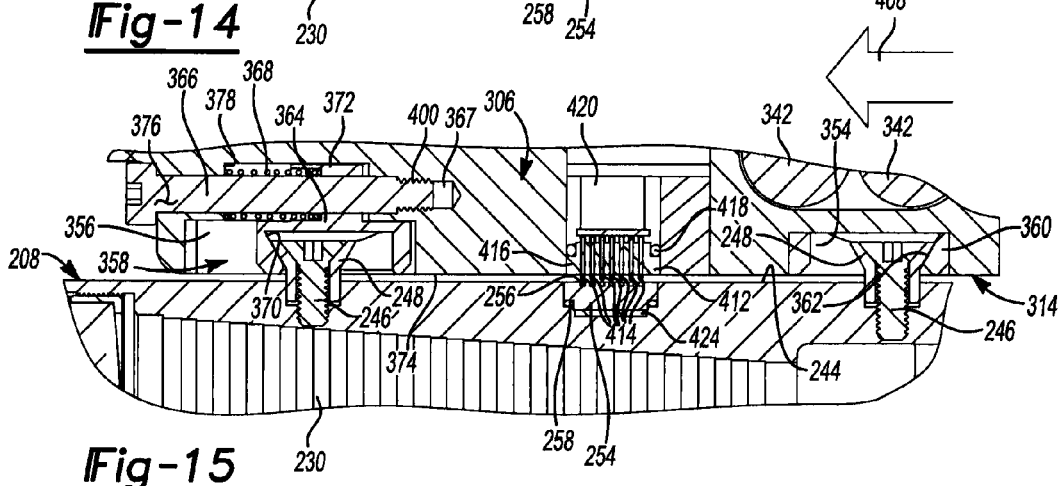
FIG. 15 is a partial cross-sectional view of the sight and module of FIG. 7 showing alignment of a pin connector of the module with a pin connector of the sight during installation of the module on the sight.
Figure 16:
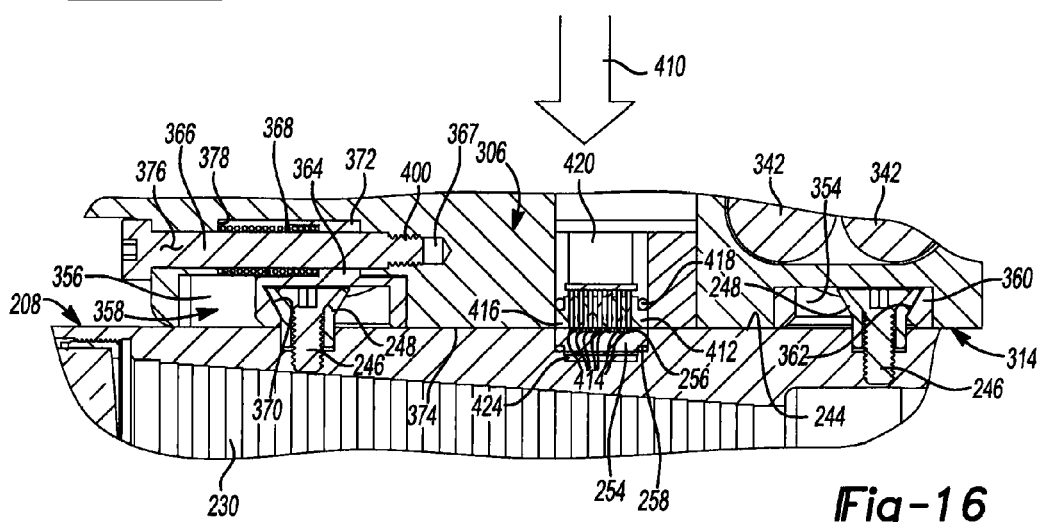
FIG. 16 is a partial cross-sectional view of the sight and module of FIG. 7 showing movement of the module toward the sight to permit a pin connector of the module to engage a pin connector of the sight.

Once the modular unit 204 has sufficiently moved in the direction identified by arrow 404 (FIG. 13), the modular unit 204 may be pivoted about the fastener 246 and collar 248 associated with the second pocket 356 in a direction identified by arrow 406 (FIG. 14). Movement of the modular unit 204 toward the base unit 202 in the direction identified by arrow 406 allows the other fastener 246 and collar 248 associated with the base unit 202 to enter the first pocket 354 of the attachment assembly 314.

Once the fastener 246 and collar 248 are disposed within the first pocket 354 of the attachment assembly 314, the modular unit 204 may be moved in a direction identified by arrow 408 (FIG. 15) until the engagement surface 362 contacts the collar 248. Movement of the modular unit 204 in the direction identified by arrow 408 may be accomplished by applying a force to the modular unit 204 and/or by allowing the biasing element 368 to apply a force on the locking element 364 via projection 372, thereby causing the modular unit 204 to move relative to the base unit 202 in the direction identified by arrow 408.

Figure 17:
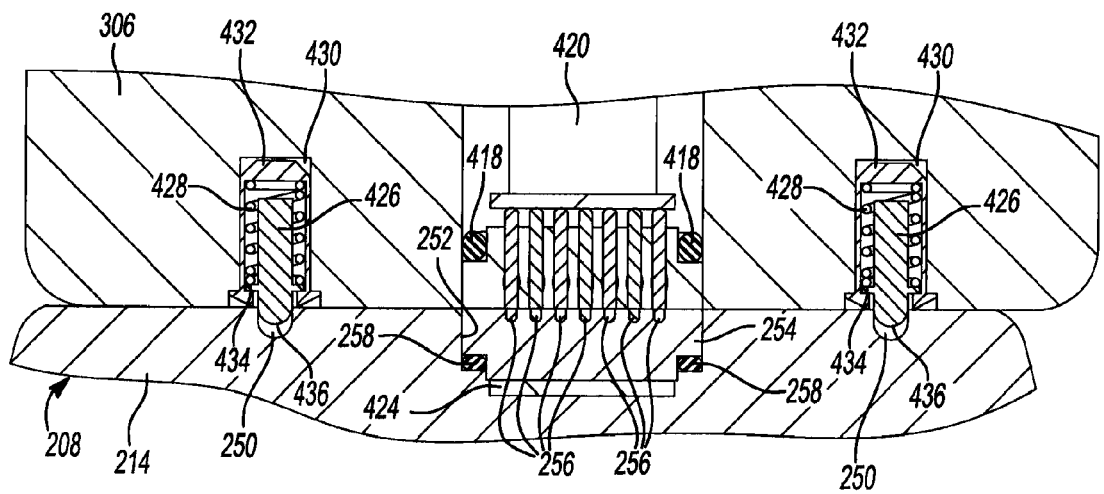
FIG. 17 is a partial cross-sectional view of the sight and module of FIG. 7 taken along line 17-17 of FIG. 7.

Once the engagement surface 362 is in contact with the collar 248, the modular unit 204 is positioned relative to the base unit 202 such that a pin connector 412 associated with the modular unit 204 is aligned with the pin connector 254 of the base unit 202. The pin connector 412 may include a series of pins 414 extending from a body 416. The pin connector 412 may be permitted to move in a direction substantially perpendicular to the bottom surface 374 of the housing 306 and may be sealed relative to the housing 306 by a seal 418 (FIG. 17).

Positioning the pin connector 412 of the modular unit 204 relative to the pin connector 254 of the base unit 202 allows the pins 414 of the pin connector 412 of the modular unit 204 to be received within the pin slots 256 of the pin connector 254 of the base unit 202. Engagement between the pins 414 of the modular unit 204 and the pin slots 256 of the base unit 202 permits electrical communication between the base unit 202 and the modular unit 204 when the modular unit 204 is installed on the base unit 202. The electrical communication between the pin connector 412 of the modular unit 204 and the pin connector 254 of the base unit 202 may be established by applying a force in the direction identified by arrow 410 (FIG. 16) once the modular unit 204 is properly positioned relative to the base unit 202 via the attachment assembly 314.

Connecting the pin connector 412 of the modular unit 204 to the pin connector 254 of the base unit 202 establishes communication between the base unit 202 and the modular unit 204. Specifically, the pin connector 412 of the modular unit 204 may be in communication with the controller 312 of the modular unit 204 via a wiring harness 420 while the pin connector 254 may similarly be connected to a driver board 422 (FIG. 21) of the base unit 202 via a wiring harness 424.

Connection between the pin connector 254 of the base unit 202 and the pin connector 412 of the modular unit 204 may be facilitated by biasing the pin connector 254 of the base unit 202 in a direction away from the top surface 244 of the base unit 202 and toward the modular unit 204. Biasing the pin connector 254 in the direction away from the base unit 202 and toward the modular unit 204 may be accomplished by the seal 258 disposed generally between the pin connector 254 and the main body 214 of the base unit 202.

The connection between the pin connector 254 of the base unit 202 and the pin connector 412 of the modular unit 204 may additionally be facilitated and maintained by positioning projections 426 (FIG. 17) associated with the modular unit 204 in the detents 250 of the base unit 202. In one configuration, the projections 426 may be biased in a direction away from the modular unit 204 and toward the base unit 202 by respective biasing elements 428. The biasing elements may be disposed within a cavity 430 formed in the main body 214 of the modular unit 204. A spring seat 432 may be disposed generally between the biasing element 428 and the cavity 430 and may be used to facilitate proper orientation of the biasing elements 428 within the cavity 430 and relative to the main body 214. The biasing elements 428 may act on the spring seat 432 and on an annular collar 434 of the projections 426. Interaction between the biasing elements 428, spring seat 432, and collar 434 causes a force to be applied on the projections 426 to bias the projections 426 in a direction substantially away from the bottom surface 374 of the modular unit 204 such that the projections 426 are biased toward the base unit 202.

During installation of the modular unit 204 and the base unit 202, the projections 426 may be retracted into the spring seats 432 and, thus, into the respective cavities 430 to permit a distal end 436 of each projection 426 to be substantially flush with the bottom surface 374 of the housing 306. Permitting the distal end 436 of each projection 426 to be substantially flush with the bottom surface 374 of the housing 306 permits the modular unit 204 to be moved relative to the base unit 202 in the direction identified by arrow 408 (FIG. 15) until the attachment assembly 314 properly positions the modular unit 204 relative to the base unit 202. Once the modular unit 204 is positioned relative to the base unit 202 such that the pin connector 412 of the modular unit 204 engages the pin connector 254 of the base unit 202, the projections 426 are likewise properly positioned relative to and above the detents 250 of the base unit 202. Positioning the projections 426 above the detents 250 of the base unit 202 permits the biasing elements 428 to bias each projection 426 in a direction substantially away from the bottom surface 374 of the modular unit 204 such that the projections 426 are permitted to enter the detents 250 of the base unit 202.

With continued reference to FIGS. 7-21, operation of the optical sight 200 will be described in detail. The modular unit 204 may be preassembled to the base unit 202 prior to the base unit 202 being mounted to the firearm 206. Alternatively, the base unit 202 may be mounted to the firearm 206 prior to the modular unit 204 being mounted to the base unit 202. While the modular unit 204 may be attached to the base unit 202 prior to the base unit 202 being attached to the firearm 206, the base unit 202 will be described hereinafter as being attached to the firearm 206 prior to the modular unit 204 being attached to the base unit 202.

The base unit 202 may be positioned relative to the firearm 206 to allow the rail 236 to slideably engage a mounting rail 438 of the firearm 206. Once the rail 236 is positioned in a desired location relative to the mounting rail 438, the set screws 240 associated with the rail 236 may be tightened to fix a position of the rail 236 relative to the firearm 206 and, thus, a position of the base unit 202 relative to the firearm 206. At this point, the base unit 202 may be used to properly align the firearm 206 relative to a target by aligning the reticle 286 with a target. As described above, alignment of the reticle 286 with a target aligns the firearm 206 with the target and, therefore, properly aligns a projectile fired from the firearm 206 with the target.

During operation of the base unit 202, the shooter may utilize a series of user controls 440 to control operation of the base unit 202. Specifically, the shooter may depress a power switch 442 to supply power to the base unit 202 and/or may depress contrast switches 444 to adjust a brightness or other parameters of the display 288. For example, the shooter may adjust the brightness, shape, and/or color of the reticle 286 generated by the display 288. A position of the reticle 286 within a field-of-view 446 (FIG. 18) may be adjusted via the first adjustment assembly 298 and second adjustment assembly 300, whereby the elevation of the reticle 286 may be adjusted via the first adjustment assembly 298 and the windage of the reticle 286 may be adjusted via the second adjustment assembly 300. The display 288 and other electrical components of the base unit 202 may be powered by one or more of a battery, a photovoltaic cell, and power received from the modular unit 204.

Figure 19:
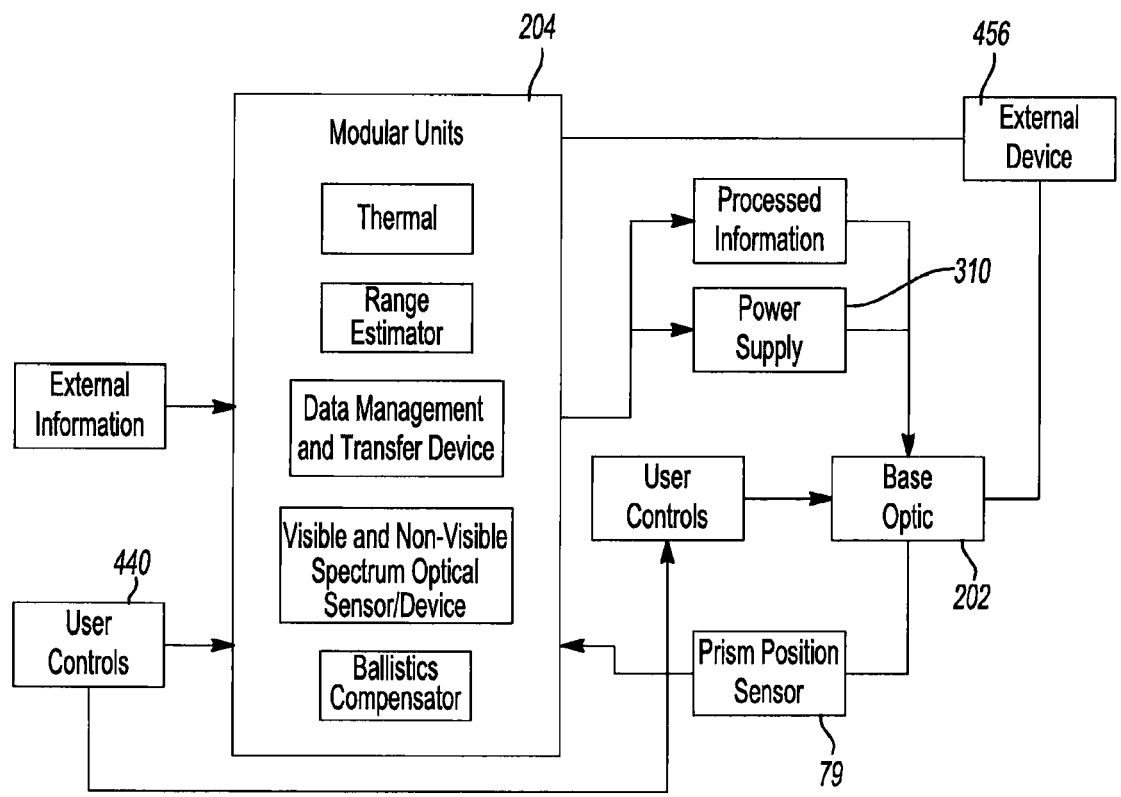
FIG. 19 is a schematic representation of a control system for use with the sight and module of FIG. 17.
Figure 20:
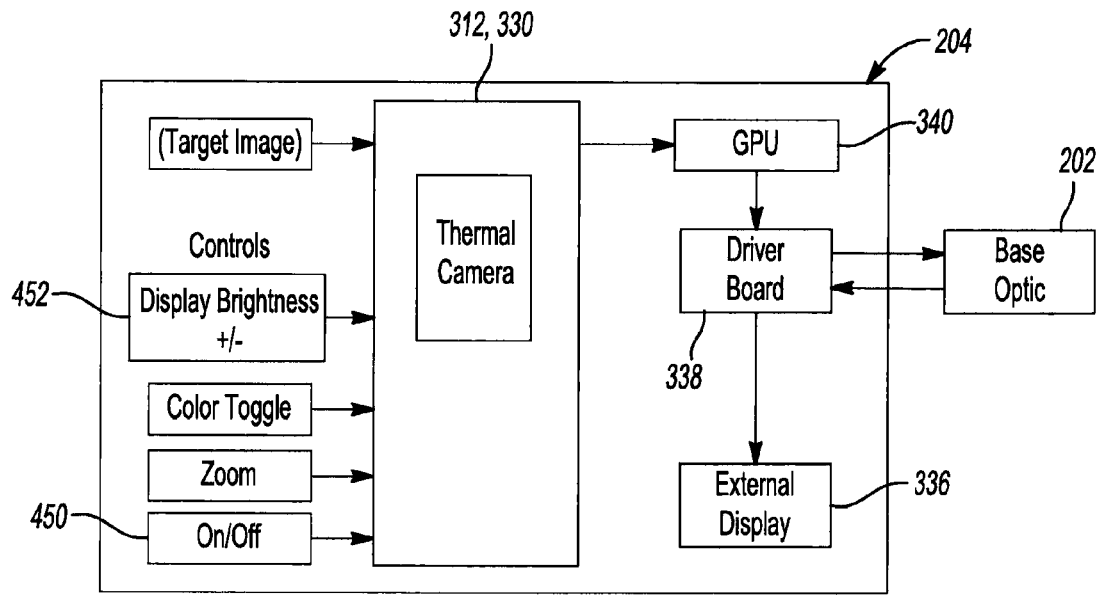
FIG. 20 is a schematic representation of a control system for use with the module of FIG. 7.
Figure 21:
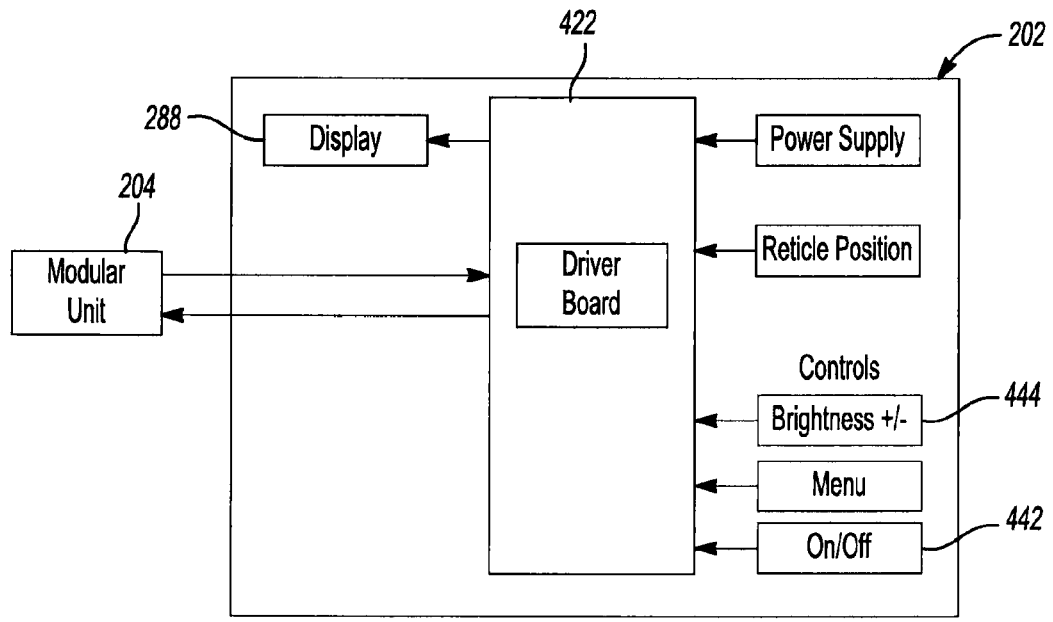
FIG. 21 is a schematic representation of a control system for use with the sight of FIG. 7.

The modular unit 204 may be attached to the base unit via the attachment assembly 314. Specifically, the attachment assembly 314 may engage the fasteners 246 and collars 248 of the base unit 202, as described above and as shown in FIGS. 12-16. Once the modular unit 204 is properly positioned relative to the base unit 202 such that the projections 426 are located within the detents 250 and the pin connector 412 of the modular unit 204 is electrically connected to the pin connector 254 of the base unit 202, electrical communication between the modular unit 204 and the base unit 202 is established. Specifically, electrical communication between the driver board 338 of the modular unit 204 and the driver board 422 of the base unit 202 is established (FIGS. 19-21).

At this point, information may be transmitted between the base unit 202 and the modular unit 204. For example, the modular unit 204 may supply data to the base unit 202 that is indicative of the thermal energy of the environment proximate to the base unit 202 and modular unit 204. Specifically, the modular unit 204 may utilize the thermal objective lens 330 to focus the thermal energy from the environment generally surrounding the base unit 202 and the modular unit 204 and may generate an image representative of the thermal energy utilizing the controller 312 and GPU 340. The thermal image may be transmitted to the base unit via the driver board 338 and may be received by the driver board 422 of the base unit 202. The base unit 202 may utilize the thermal image received from the modular unit 204 and may display the thermal image to the shooter via the mirror prism 282. Specifically, the driver board 422 of the base unit 202 may display the thermal image received from the modular unit 204 utilizing the display 288 associated with the mirror prism 282 such that the thermal image is overlayed over the magnified image of a target and may be viewed by the shooter at the eyepiece 216 of the base unit 202.

When the modular unit 204 is attached to the base unit 202, the controller 312 of the modular unit 204 does not utilize the display 336 of the modular unit 204 to display the thermal image. Rather, the controller 312 may turn off the display 336 when the modular unit 204 is attached to the base unit 202 to prevent light generated by the display 336 from being viewed at the eyepiece 324 of the modular unit 204. When the modular unit 204 is removed from the base unit 202, the controller 312 of the modular unit 204 may initiate the display 336 to allow the display 336 to generate the thermal image, which can be viewed at the eyepiece 324 of the modular unit 204. As such, the modular unit 204 may be utilized as a stand-alone unit separate and apart from the base unit 202 when the modular unit 204 is separated from the base unit 202. Therefore, the modular unit 204 may be used as a stand-alone thermal camera to generate a thermal image of a target when the modular unit 204 is removed from the base unit 202.

Regardless of whether the modular unit 204 is attached to the base unit 202, the power utilized to generate the thermal image is generated by the modular unit 204 via the batteries 342 and/or photovoltaic cell 344. Further, when the modular unit 204 is attached to the base unit 202, power from the batteries 342 and/or photovoltaic cell 344 of the modular unit 204 may be utilized by both the modular unit 204 and the base unit 202 in generating the thermal image, reticle 286, and other functions of the base unit 202 and modular unit 204.

When the modular unit 204 is attached to the base unit 202, the pin connector 254 is attached to the pin connector 412 and therefore permits communication between the base unit 202 and the modular unit 204, as previously described. Allowing communication between the base unit 202 and the modular unit 204 allows the shooter to control the base unit 202 and modular unit 204 via either the user controls 440 associated with the base unit 202 or via the user controls 450 associated with the modular unit 204. For example, the shooter could depress the contrast switches 444 associated with the base unit 202 or the contrast switches 452 associated with the modular unit 204 to adjust a brightness or other parameters of the display 288.

When the modular unit 204 is attached to the base unit 202, the modular unit 204 continually updates a position of the reticle 286 within the field-of-view 446. Specifically, the driver board 422 of the base unit 202 communicates a position of the reticle 286 within the field-of-view 446 based on information received from the sensors 79 associated with the first adjustment assembly 298 and the second adjustment assembly 300. The sensors 79 provide information as to how far the reticle 286 has been adjusted relative to a factory setting—both in terms of elevation and windage. This information may be utilized by the driver board 338 of the modular unit 204 to adjust the location of where the thermal image is obtained to ensure that the thermal image generated by the modular unit 204 is that of a desired target and, more specifically, that the thermal image coincides with the location of the reticle 286.

The modular unit 204 may automatically adjust the location at which the thermal image is generated to ensure that the location is properly aligned with the current position of the reticle 286. Proper alignment between the modular unit 204 and the base unit 202 ensures that the target to which the shooter aligns the reticle 286 is properly aligned with the thermal image when the thermal image is overlayed over the magnified image at the mirror prism 282.

While the modular unit 204 is described as being capable of automatically adjusting the location at which the modular unit 204 obtains a thermal image, the modular unit 204 could alternatively be manually adjustable. For example, the modular unit 204 may rely on a graphical representation within the field-of-view 446 to alert the shooter as to how much and in what direction an adjustment should be made to the modular unit 204 to bring the modular unit 204 in line with the location of the reticle 286 of the base unit 202. For example, the base unit 202 may generate one or more arrows 448 (FIG. 18) that identify a direction(s) in which the shooter should adjust the output of the modular unit 204 to ensure that the modular unit 204 is trained on the same target as is the reticle 286 of the base unit 202.

The modular unit 204 may display one or both of the directional arrows 448 shown in FIG. 18 until the shooter properly adjusts an output of the modular unit 204. Once the output of the modular unit 204 is adjusted and is properly aligned with the reticle 286 of the base unit 202, the modular unit 204 may remove the arrow(s) 448 from the field-of-view 446 or, alternatively, may change the color of the arrow(s) 448 indicating that the shooter has properly aligned an output of the modular unit 204 with the reticle 286 of the base unit 202.

The modular unit 204 may include a series of user controls 450 (FIG. 8) that allows the shooter to adjust various parameters of the modular unit 204. For example, the user controls 450 may include contrast switches 452 that allow the shooter to adjust a brightness of the display 336 when the modular unit 204 is detached from the base unit 202. The user controls 450 may also provide the shooter with the ability to adjust a position of the output of the modular unit 204 when manually adjusting an output of the modular unit 204 to account for a position of the reticle 286 relative to the field-of-view 446 of the base unit 202.

When the modular unit 204 is attached to the base unit 202 and an output of the modular unit 204 is aligned either manually or automatically with the position of the reticle 286 relative to the field of view 446 of the base unit 202, a shooter may align the reticle 286 with a target to obtain not only a magnified image of the target but also a thermal image of the target. The thermal image is displayed within the field-of-view 446 and is overlayed over the magnified image by the display 288. As described above, the thermal image is received by the display 288 from the modular unit 204 and is directed to the field-of-view 446 of the base unit 202 via the mirror prism 282 and eyepiece 216.

While the modular unit 204 is described as providing a thermal image of a target, the modular unit 204 could provide virtually any additional data for use by the shooter in properly aligning the base unit 202 and, thus, the firearm 206 relative to a target. For example, the modular unit 204 could additionally or alternatively include a range estimation 454 (FIG. 18), visible spectrum and non-visible spectrum optical data, and/or ballistics information. Further, the modular unit 204 may also provide a data management and/or transfer capability that allows the modular unit 204 and/or the base unit 202 to communicate with an external device 456 (FIG. 19). The external device 456 may be a central control that allows for tracking of targets and/or shooters in the field. For example, if a team of ten personnel each include a modular unit 204 attached to a base unit 202, a central command may be able to monitor operation of and/or communicate with the ten shooters in the field by receiving data from the modular unit 204.

As described above, the modular unit 204 may include one or more functions that may provide data to the base unit 202. While the modular unit 204 may include multiple functions, the various functions could alternatively be implemented in different modular units 204 to allow the shooter to choose between different modular units 204 depending on the conditions of the particular application. For example, if a shooter is operating in low-light conditions or in a dense jungle, for example, the shooter may install a modular unit 204 having thermal imaging capabilities on the base unit 202 to overlay a thermal image of a target over the magnified image generated by the base unit 202. If, on the other hand, the shooter is operating in a well-lit area, and is using a firearm suitable for long-range targets, the shooter may choose a modular unit 204 that provides range-estimation data and/or ballistics compensation data to the base unit 202 for display in the field-of-view 446.

Providing the base unit 202 with the ability to be selectively attached to modular units 204 having various capabilities and functions, allows the shooter to utilize the same base unit 202 during virtually any shooting environment. Further, providing the shooter with the ability to connect different modular units 204 to the base unit allows the shooter to tailor the overall functionality of the base unit 202 to the particular environment and tactical objective.

What is claimed is:

1. An optical sight comprising:
    a housing;
    an optics train disposed at least partially within said housing and including at least one prism having a first surface;
    a display disposed on said first surface and operable to selectively supply said first surface with an image;
    a processor in communication with said display and operable to provide said display with said image; and
    an infrared camera in communication with said processor and operable to provide said processor with thermal-energy data for use by the processor in generating said image.

2. The optical sight of claim 1, wherein said display is one of a liquid crystal display (LCD), light-emitting diode (LED), organic light-emitting diode (OLED), or a laser projector.

3. The optical sight of claim 1, wherein said surface includes a dichroic coating.

4. The optical sight of claim 1, wherein said optics train concurrently displays said image along with a magnified image.

5. The optical sight of claim 1, wherein said infrared camera is selectively removable from said housing.

6. An optical sight comprising:
    a housing;
    an optics train disposed at least partially within said housing and including at least one prism having a first surface;
    a display associated with said first surface and operable to selectively supply said first surface with an image;
    a processor in communication with said display and operable to provide said display with said image; and
    an infrared camera in communication with said processor and operable to provide said processor with thermal-energy data for use by the processor in generating said image, said infrared camera being selectively removable from said housing.

7. The optical sight of claim 6, wherein said display is one of a liquid crystal display (LCD), light-emitting diode (LED), organic light-emitting diode (OLED), or a laser projector.

8. The optical sight of claim 7, wherein said display is disposed on said surface of said prism.

9. The optical sight of claim 6, wherein said display is disposed on said surface of said prism.

10. The optical sight of claim 9, wherein said surface includes a dichroic coating.

11. The optical sight of claim 6, wherein said surface includes a dichroic coating.

12. The optical sight of claim 6, wherein said optics train concurrently displays said image along with a magnified image.

* * * * *